US010737445B1

(12) United States Patent
Kayhart et al.

(10) Patent No.: US 10,737,445 B1
(45) Date of Patent: Aug. 11, 2020

(54) FILAMENT WINDING FOR ORIENTATION AND SPREADING ON A SUBSTRATE

(71) Applicant: U.S. Government as Represented by the Secretary of the Army, Natick, MA (US)

(72) Inventors: Tony J Kayhart, Natick, MA (US); Jason C Parker, Natick, MA (US); Nicholas Tsantinis, Natick, MA (US); John W Song, Natick, MA (US); Damian Kubiak, Natick, MA (US)

(73) Assignee: U.S. Government as Represented by the Secretary of the Army, Washington, DC (US)

( * ) Notice: Subject to any disclaimer, the term of this patent is extended or adjusted under 35 U.S.C. 154(b) by 321 days.

(21) Appl. No.: 15/883,379

(22) Filed: Jan. 30, 2018

(51) Int. Cl.
| | | |
|---|---|---|
| *B29C 70/30* | (2006.01) |
| *B29C 70/32* | (2006.01) |
| *B29C 70/22* | (2006.01) |
| *B29C 70/34* | (2006.01) |
| *B29C 70/38* | (2006.01) |
| *B65H 54/10* | (2006.01) |
| *B65H 54/22* | (2006.01) |
| *B29K 623/00* | (2006.01) |

(52) U.S. Cl.
CPC ............ *B29C 70/32* (2013.01); *B29C 70/222* (2013.01); *B29C 70/34* (2013.01); *B29C 70/382* (2013.01); *B65H 54/10* (2013.01); *B65H 54/22* (2013.01); *B29K 2623/12* (2013.01); *B29K 2995/0026* (2013.01); *B65H 2701/313* (2013.01)

(58) Field of Classification Search
CPC . B65H 81/04; B65H 81/06; B21F 3/04; B21F 3/08; B29C 53/58; B29C 53/60; B29C 53/665; B29C 53/70
See application file for complete search history.

(56) References Cited

U.S. PATENT DOCUMENTS

| | | | | |
|---|---|---|---|---|
| 1,252,109 A | * | 1/1918 | Heckman .............. | H01F 41/082 242/447.2 |
| 3,701,489 A | * | 10/1972 | Goldsworthy .......... | B29C 53/76 242/437.2 |
| 3,981,131 A | | 9/1976 | Hartig et al. | |
| 4,056,238 A | | 11/1977 | Ciniglio et al. | |
| 4,235,656 A | | 11/1980 | Shimano et al. | |

(Continued)

FOREIGN PATENT DOCUMENTS

EP 0096507 12/1983

*Primary Examiner* — Emmanuel M Marcelo
(74) *Attorney, Agent, or Firm* — Roger C Phillips

(57) ABSTRACT

A method, apparatus, and system for winding a filament around a substrate includes mounting the substrate to a rotatable structure and rotating the substrate to wind the first filament around the substrate in a first winding orientation that winds the first filament around a first pair of edges of the substrate to wrap a first filament layer around the substrate. The method further includes changing winding orientations of the first filament from the first winding orientation to a second winding orientation by turning the first filament about a corner of the substrate and winding the first filament around the rotating substrate in the second winding orientation that winds the first filament around a second pair of edges of the substrate, wherein the second pair of edges is different from the first pair of edges, to wrap a second filament layer around the substrate.

26 Claims, 15 Drawing Sheets

(56) References Cited

U.S. PATENT DOCUMENTS

| | | | |
|---|---|---|---|
| 4,369,934 A | | 1/1983 | Spies |
| 4,538,770 A | * | 9/1985 | Sedgewick .......... H02K 15/085 |
| | | | 242/432.3 |
| 4,589,679 A | * | 5/1986 | Wackerle ................ F16C 3/026 |
| | | | 280/777 |
| 4,601,432 A | * | 7/1986 | Sedgewick .......... H02K 15/085 |
| | | | 242/433 |
| 4,650,620 A | | 3/1987 | Owen et al. |
| 4,799,981 A | | 1/1989 | Stone et al. |
| 4,867,834 A | | 9/1989 | Alenskis et al. |
| 5,000,397 A | | 3/1991 | Darrieux |
| 5,192,597 A | | 3/1993 | Forsythe |
| 5,277,373 A | | 1/1994 | Morton |
| 5,645,677 A | | 7/1997 | Cahuzac et al. |
| 6,491,773 B1 | | 12/2002 | Miller et al. |
| 7,124,797 B2 | | 10/2006 | Anderson et al. |
| 7,810,754 B2 | | 10/2010 | Uozumi |
| 8,282,758 B2 | | 10/2012 | Van Nieuwenhove et al. |
| 9,067,756 B2 | * | 6/2015 | Tanigawa ................ B65H 57/00 |
| 2013/0068873 A1 | | 3/2013 | Motohiro et al. |
| 2014/0000796 A1 | | 1/2014 | Marissen et al. |
| 2015/0273811 A1 | | 10/2015 | Le Costaquec |
| 2017/0274603 A1 | * | 9/2017 | Iwata .................... B29C 70/207 |
| 2017/0326822 A1 | * | 11/2017 | Jeon ........................ B29C 70/32 |

* cited by examiner

US 10,737,445 B1

FILAMENT WINDING FOR ORIENTATION AND SPREADING ON A SUBSTRATE

STATEMENT OF GOVERNMENT INTEREST

The material described herein may be manufactured and used by or for the U.S. Government for governmental purposes without the payment of any royalties thereon or therefor.

FIELD OF THE DISCLOSURE

Embodiments of the present disclosure relate generally to filaments and more specifically to methods, systems, and software for laying and winding filaments on substrates.

BACKGROUND

Filament winding is typically the process of winding a fiber material with a resin around a mounted mandrel. The process of filament winding is generally used to create circular composite products with a hollow core. In winding multiple layers around the mandrel, the windings for the different layers usually run in the same direction. This can result in a weaker composite product or a heavier composite product using more fiber material for additional winds to achieve a strength objective.

To set a new winding direction, the mandrel is removed from its mount and remounted with a different orientation. This can result in the twisting and knotting of the fiber material. One solution involves cutting the fiber material, reattaching the fiber material to the mandrel, and separately winding layers having different winding directions. This, however, adds complications which can make it difficult to fully automate a winding process involving different layers with different winding directions.

SUMMARY

Generally speaking, pursuant to various embodiments described herein, the present disclosure provides apparatuses, systems, and methods for winding filaments on substantially flat substrates. The present disclosure also provides apparatuses, systems, and methods for processing the filament windings into composite materials and post processing the composite materials into three dimensional articles.

In accordance with the teachings herein, a method performed by a filament winding system includes mounting a substantially flat substrate to a rotatable substrate mounting structure of the filament winding system, wherein the substrate has multiple edges and multiple corners with a different corner between each pair of adjacent edges of the multiple edges. The method also includes rotating the substrate to wind a first filament of a set of filaments around the substrate in a first winding orientation that winds the first filament around a first pair of edges of the multiple edges to wrap a first filament layer around the substrate. The method further includes changing winding orientations of the first filament relative to the substrate from the first winding orientation to a second winding orientation, without removing the substrate from the substrate mounting structure, by turning the first filament about a corner of the multiple corners and winding the first filament around the rotating substrate in the second winding orientation that winds the first filament around a second pair of edges of the multiple edges, wherein the second pair of edges is different from the first pair of edges, to wrap a second filament layer around the substrate.

In one case, the method also includes winding a second filament of the set of filaments around the rotating substrate in the first winding orientation while the first filament is being wound around the rotating substrate in the first winding orientation. In another case, the method also includes winding a second filament of the set of filaments around the rotating substrate in the first winding orientation while the first filament is being wound around the rotating substrate in the first winding orientation. The method further includes moving a first transport carriage of the filament winding system to guide the first filament onto the rotating substrate and moving a second transport carriage of the filament winding system to guide the second filament onto the rotating substrate. In one case, the method includes moving the first transport carriage relative to the second transport carriage to weave the first filament with the second filament as the first filament and the second filament are wound around the rotating substrate.

In some embodiments, the method further includes removing the substrate with the first filament layer and the second filament layer wrapped around the substrate and processing the first filament layer and the second filament layer into a composite material. In one embodiment, processing the first filament layer and the second filament layer into a composite material includes applying heat to the first filament layer and the second filament layer to raise a temperature of the first filament of the first filament layer and the second filament layer to a processing temperature below a melting temperature of a second component of the first filament, to leave the second component intact, and above a melting temperature of a first component of the first filament, to melt the first component into a continuous matrix in which the intact second component is embedded. In a number of embodiments, the method includes post processing the composite material by molding the composite material into a rigid three-dimensional shape.

In another embodiment, processing the first filament layer and the second filament layer into a composite material includes applying heat to the first filament layer and the second filament layer to raise a temperature of the first filament of the first filament layer and the second filament layer to a processing temperature below a melting temperature of a second component of the first filament, to leave the second component intact, and near a melting temperature of a first component of the first filament, to soften the first component. The method further includes applying pressure to the first filament layer and the second filament layer to fuse the softened first component into a continuous matrix in which the intact second component is embedded.

In accordance with the teachings herein, a filament winding system includes a rotatable substrate mounting structure for mounting and rotating a substantially flat substrate to wind a first filament of a set of filaments around the substrate, wherein the substrate has multiple edges and multiple corners with a different corner between each pair of adjacent edges of the multiple edges. The filament winding system also includes a first moveable transport carriage for guiding the first filament onto the substrate as the first filament is being wound around the substrate; at least one motor, coupled to the substrate mounting structure and coupled to the first transport carriage, for rotating the substrate mounting structure and for moving the first transport carriage; and at least one controller, operationally coupled to the at least one motor, for controlling the at least one motor. The filament winding system further includes a processing device, operationally coupled to the at least one controller, for executing a winding program to rotate the substrate to wind the first filament around the substrate in a first winding orientation that winds the first filament around a first pair of edges of the multiple edges to wrap a first filament layer around the substrate. The processing device is also configured to change winding orientations of the first filament relative to the substrate from the first winding orientation to a second winding orientation, without removing the substrate from the substrate mounting structure, by turning the first filament about a corner of the multiple corners and wind the first filament around the rotating substrate in the second winding orientation that winds the first filament around a second pair of edges of the multiple edges, wherein the second pair of edges is different from the first pair of edges, to wrap a second filament layer around the substrate.

In additional embodiments, the filament winding system further includes a second moveable transport carriage, operationally coupled to the at least one motor, for guiding a second filament of the set of filaments onto the substrate as the second filament is being wound around the substrate, wherein the processing device executes the winding program to further wind the second filament around the rotating substrate in the first winding orientation while the first filament is being wound around the rotating substrate in the first winding orientation. In one embodiment, the first moveable transport carriage and the second moveable transport carriage are positioned on opposite sides of the substrate mounting structure so the mounted substrate rotates between the first moveable transport carriage and the second moveable transport carriage.

In another embodiment, the filament winding system further includes a second moveable transport carriage, operationally coupled to the at least one motor, for guiding a second filament of the set of filaments onto the substrate as the second filament is being wound around the substrate, wherein the processing device executes the winding program to further wind the second filament around the rotating substrate in the second winding orientation while the first filament is being wound around the rotating substrate in the first winding orientation. In one case, the processing device executes the winding program to further move the first transport carriage relative to the second transport carriage to weave the first filament with the second filament as the first filament and the second filament are wound around the rotating substrate.

In several embodiments, the filament winding system includes a filament feeding apparatus to supply the first filament to the first moveable transport carriage for guiding the first filament onto the rotating substrate, wherein a single continuous length of the first filament is wound around the substrate to form the first filament layer and the second filament layer. In one implementation, the filament feeding apparatus supplies the first filament by dispensing the first filament from a spool of the first filament. In another implementation, the filament feeding apparatus supplies the first filament by extruding the first filament as the first filament is being formed. For a further embodiment, the first filament is formed from multiple components with at least two of the multiple components having different melting point temperatures. In some instances, the multiple components of the filament have optical properties which result in windings of the filament being processed into a transparent a composite material. In other instances, the multiple components of the first filament include a core component and one or more layered components surrounding the core component, wherein the core component has a higher melting point temperature than a sheath component, wherein the sheath component is an outermost component of the one or more layered components surrounding the core component.

In one embodiment, the filament winding system further includes at least one tensioning device, through which the first filament passes, to sufficiently tension the first filament to prevent the first filament from slipping along the edges of the multiple edges of the substrate as the filament is being wound around the substrate. In another embodiment, the first moveable transport carriage of the filament winding system guides the first filament onto the rotating substrate with a settable spacing between individual windings of the first filament around the substrate, wherein the settable spacing is set by the processing device executing the winding program.

With some embodiments, the at least one motor of the filament winding system includes a first motor coupled to the substrate mounting structure for rotating the substrate mounting structure. The at least one motor of the filament winding system also includes a second motor coupled to the first transport carriage for moving the first transport carriage.

In a different embodiment, a filament winding system includes a rotatable substrate mounting structure for mounting, rotating, and translating a substantially flat substrate to wind a first filament of a set of filaments around the substrate, wherein the substrate has multiple edges and multiple corners with a different corner between each pair of adjacent edges of the multiple edges. The filament winding system also includes a filament guide for guiding the first filament onto the substrate as the first filament is being wound around the substrate; at least one motor, coupled to the substrate mounting structure for rotating and translating the substrate mounting structure, to which the substrate is mounted, relative to the filament guide; and at least one controller, operationally coupled to the at least one motor, for controlling the at least one motor. The filament winding system further includes a processing device, operationally coupled to the at least one controller, for executing a winding program to rotate the substrate to wind the first filament around the substrate in a first winding orientation that winds the first filament around a first pair of edges of the multiple edges to wrap a first filament layer around the substrate. The processing device is also additionally configured to change winding orientations of the first filament relative to the substrate from the first winding orientation to a second winding orientation, without removing the substrate from the substrate mounting structure, by turning the first filament about a corner of the multiple corners and wind the first filament around the rotating substrate in the second winding orientation that winds the first filament around a second pair of edges of the multiple edges, wherein the second pair of edges is different from the first pair of edges, to wrap a second filament layer around the substrate.

For some embodiments, a filament winding system includes a rotatable substrate mounting structure, for mounting and rotating a substantially flat substrate to wind a filament around the substrate, and a moveable transport carriage, for guiding the filament onto the substrate as the filament is being wound around the substrate. The filament winding system also includes at least one motor, coupled to the substrate mounting structure and coupled to the transport carriage, for rotating the substrate mounting structure and for moving the transport carriage. The filament winding system additionally includes at least one controller, operationally coupled to the at least one motor, for controlling the at least one motor, and a processing device, operationally coupled to the at least one controller, for executing a winding program. The winding program rotates the substrate to wind the filament around the substrate in a first winding orientation to wrap a first filament layer around the substrate. The winding program also changes winding orientations of the filament relative to the substrate from the first winding orientation to a second winding orientation, without removing the substrate from the substrate mounting structure, by turning the filament about the substrate in a transitional direction that is different from a first direction of the first winding orientation and a second direction of the second winding orientation. The winding program additionally winds the filament around the rotating substrate in the second winding orientation to wrap a second filament layer around the substrate.

In some instances, the substrate is shaped as a closed plane curve. In other instances, the substrate is shaped as a polygon. For several embodiments, turning the filament about the substrate in a transitional direction includes turning the filament against a portion of the rotatable substrate mounting structure in contact with the substrate.

BRIEF DESCRIPTION OF THE FIGURES

The accompanying figures, for which like reference numerals refer to identical or functionally similar elements throughout the separate views, together with the detailed description below, are incorporated in and form part of the specification. The figures serve to illustrate embodiments of concepts included in the claims and to show various features and advantages of those embodiments.

Figure 1A:
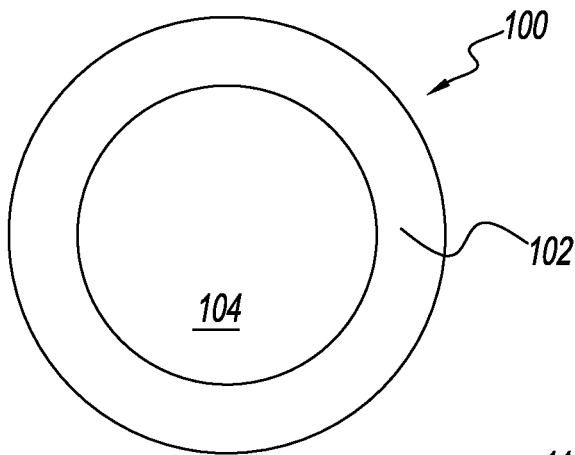
FIG. 1A shows a cross-sectional view of a filament, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present teachings. It will be further appreciated that while certain actions and/or steps may be described or depicted in a particular order of occurrence, the presented order of occurrence is not a requirement and that other orders of occurrence are possible in different implementations.

System components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

The following detailed description references the accompanying figures in describing exemplary embodiments consistent with this disclosure. The exemplary embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure. Rather, the scope of the present disclosure is defined only in accordance with the presented claims and equivalents thereof.

Generally speaking, pursuant to various embodiments described herein, the present disclosure provides apparatuses, systems, and methods for winding filaments on substantially flat substrates. A substantially flat substrate is a substrate having a thickness measurement at least an order of magnitude less than a width measurement and a height measurement of the substrate. The present disclosure also provides apparatuses, systems, and methods for processing the filament windings into composite materials and post processing the composite materials into three dimensional articles.

After one or more filaments are wound on a substrate, the filament windings can be further processed, with or without the substrate, by heating and/or compressing the filament windings so that the filament windings are formed into a composite material. For various embodiments, filament windings fuse with one another under elevated temperature and/or pressure to produce a sheet of composite material. In a number of embodiments, the structure and/or makeup of filaments facilitates the formation of composite materials from the filament windings. In further embodiments, post processing can transform the composite materials into rigid three-dimensional structures.

FIG. 1A shows an example of a filament 100 in a cross-sectional view. A filament is a substantially continuous linear material having a length dimension at least two orders of magnitude greater than any width dimension. A filament, for example, can represent or resemble a strand, line, cord, fiber, string, thread, twine, yarn, cable, or ribbon capable of being wound around a substrate. A set of filaments is defined to be one or more filaments.

Figure 13:
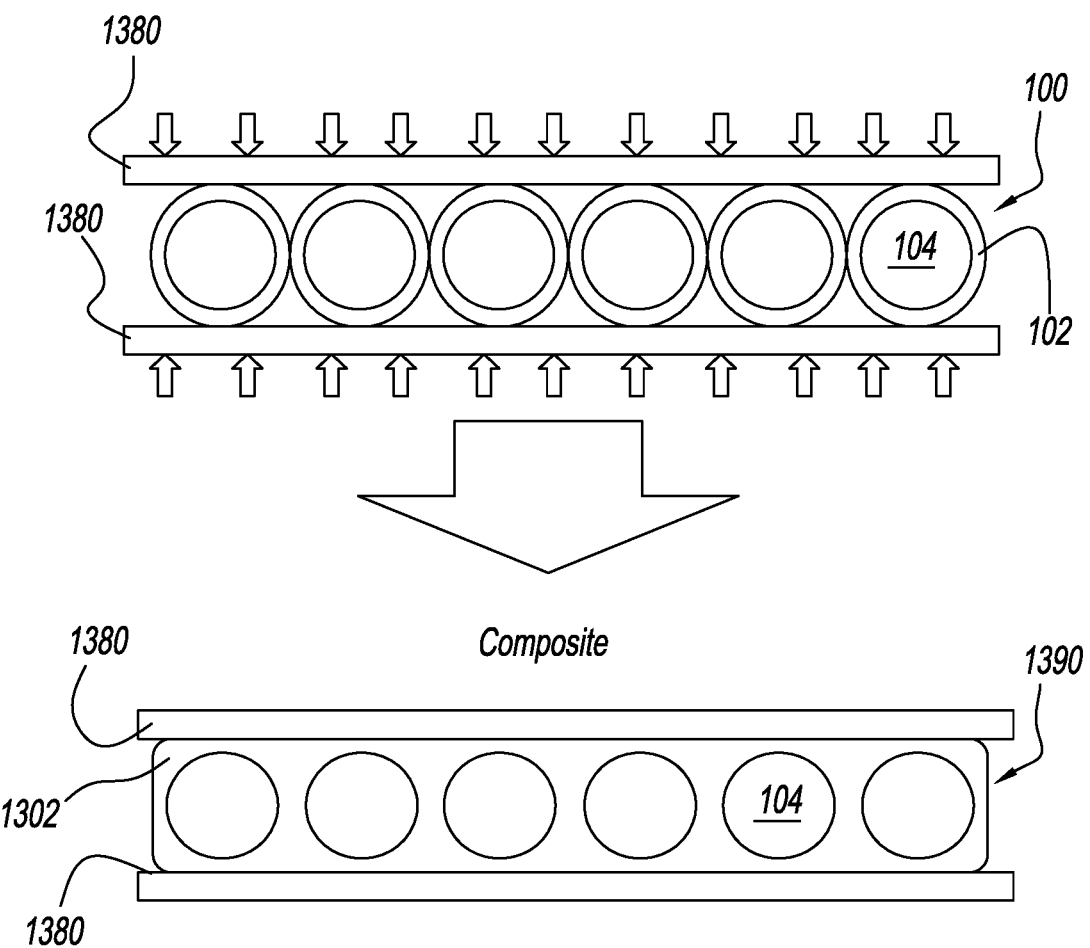
FIG. 13 shows the formation of a composite material from a single wound filament layer, in accordance with some embodiments.
Figure 14:
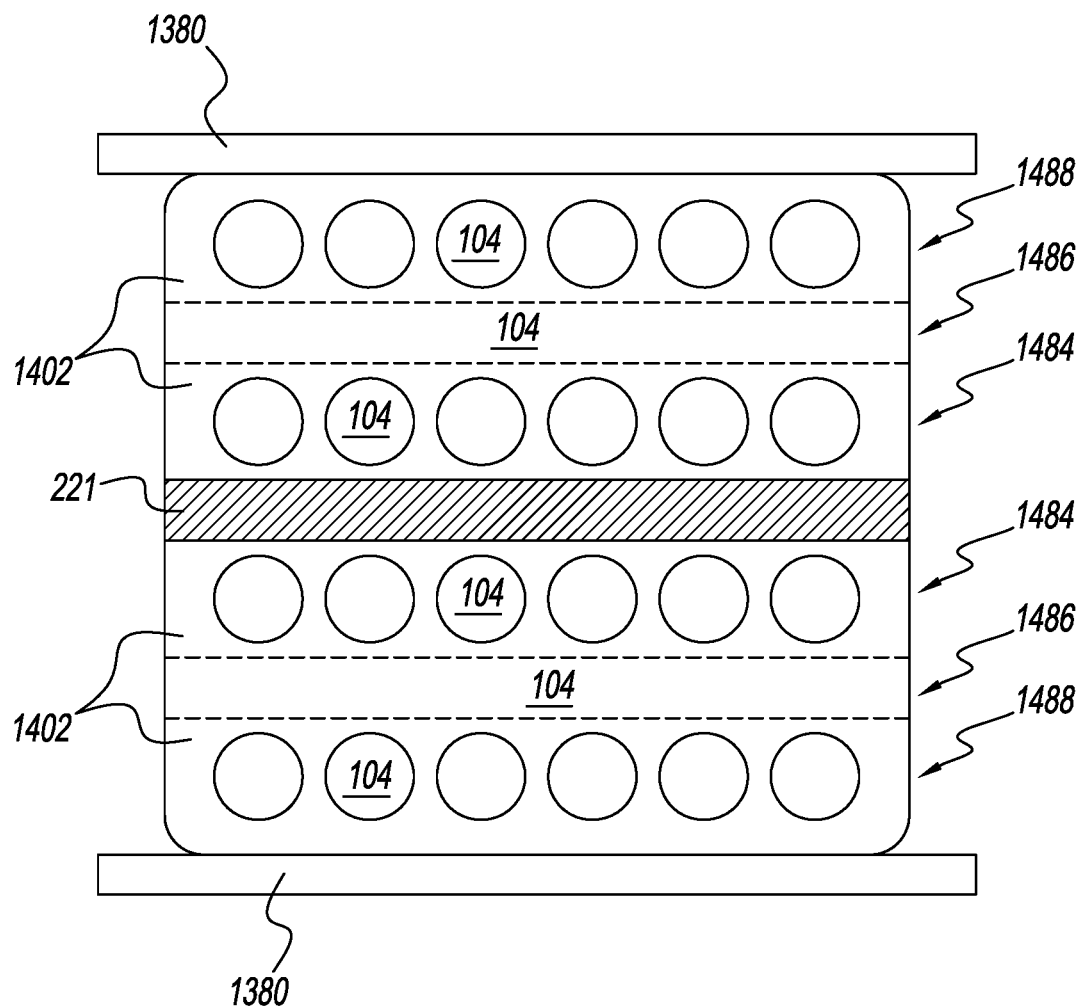
FIG. 14 shows the formation of a composite material from multiple wound filament layers, in accordance with some embodiments.

The filament 100 is a round bi-component filament having a filament sheath 102 surrounding a filament core 104. For an embodiment, the material making up the sheath 102 has a lower melting point than the material making up the core 104. When windings of the filament 100 are subject to a temperature greater than the melting temperature of the sheath material and also less than the melting temperature of the core material, the sheath material melts while the core material remains intact, thereby fusing the windings together into a composite material. Cross-sectional views of a composite material formed from windings of the filament 100 are shown in FIGS. 13 and 14.

For some embodiments, the multiple components of the filament 100 include a core component and one or more layered components surrounding the core component, wherein the core component has a higher melting point temperature than a sheath component, wherein the sheath component is an outermost component of the one or more layered components surrounding the core component. In the embodiment illustrated by FIG. 1A, for which there is only one layered component, the core component is the filament core 104, and the sheath component is the filament sheath 102.

In different embodiments, a filament can have any number of components. In one embodiment, for example, a tri-component filament has a core with two concentric sheaths. In another embodiment, a single-component filament is passed through a bath or otherwise exposed to an applicator so that a resin or similar coating is applied to the outside of the filament prior to the filament being wound around a substrate. The filament coating then melts with the application of heat while the filament itself remains intact.

In one implementation, the entire filament 100 consists of polypropylene. The filament sheath 102, however, is a more syndiotactic form of polypropylene as compared to a more isotactic form of polypropylene for the filament core 104. This gives the sheath 102 a lower melting point (e.g., 130-150° C.) than the melting point (e.g., 160-170° C.) of the core 104. By heating the windings of the filament 100 to a temperature (e.g., 131-159° C.) between the two melting points, the filament sheath partially of fully liquefies, thereby melting the windings together into a composite material. In some instances, only enough heat is applied to the filament windings to partially or fully soften the outer sheath 102. The windings are then fused together with the application of pressure, such as from a press.

For different embodiments, filaments are made from different materials and/or have differently shaped cross-sectional structures. In some embodiments, for example, a filament has two or more strands, at least two of which have different melting points, twisted or woven about one another. In other embodiments, individual strands run parallel to one another without being twisted or woven together so a filament made from the strands resembles the structure of speaker cable or lamp cord.

Figure 1B:
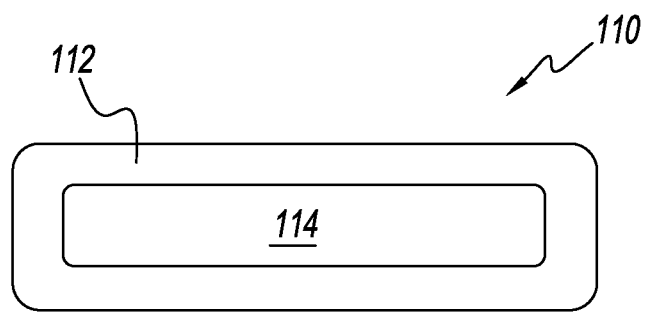
FIG. 1B shows a cross-sectional view of a filament, in accordance with some embodiments.

FIG. 1B shows a bi-component ribbon-shaped filament 110 in cross section. The filament 110 a ribbon-shaped core component 114 surrounded by a ribbon-shaped sheath 112 component. Here, the ribbon-shaped filament 110 has a width dimension which is greater than a height dimension for the filament 110. For an embodiment, the core component 114 has a higher melting point temperature than the sheath component 112.

Figure 1C:
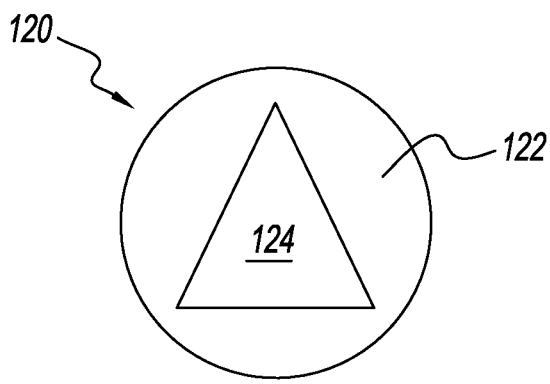
FIG. 1C shows a cross-sectional view of a filament, in accordance with some embodiments.

FIG. 1C shows a bi-component filament 120 having a core component 124 of triangular cross section surrounded by a sheath component 122 of circular cross section. For an embodiment, the core component 124 has a higher melting point temperature than the sheath component 122.

Figure 1D:
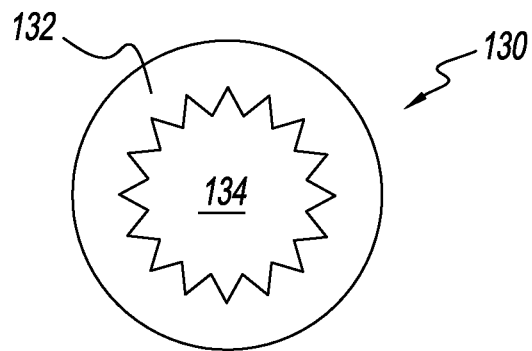
FIG. 1D shows a cross-sectional view of a filament, in accordance with some embodiments.

FIG. 1D shows a bi-component filament 130 having a core component 134 with a star-shaped cross section. While a 16-point star is shown for illustrative purposes, other embodiments can include star-shaped cross sections with different numbers of points. The core component 134 is surrounded by a sheath component 132 of circular cross section. For an embodiment, the core component 134 has a higher melting point temperature than the sheath component 132.

In different embodiments, a filament core component having any shape can be surrounded by a filament sheath component having the same shape, as illustrated for filaments 100 and 110. The filament sheath component can also have a different shape from the filament core component, as illustrated for filaments 120 and 130. In further embodiments, a filament can have an intermediate layered component which surrounds the core component and is surrounded by the sheath component. The intermediate layered component can have the same cross sectional shape as either or both of the core and sheath components. The intermediate layered component can alternatively have a different cross-sectional shape from the core and sheath components.

For a number of embodiments, different transparent material components of a filament have the same or closely matching refractive indices. This eliminates or reduces visual distortion for a transparent composite material created from windings of the filament.

In several embodiments, different portions or components of a filament are made from a material or materials having different molecular weights. By exposing the windings of the filament to heat, the portion or portions of the filament having a lower molecular weight melt or soften, whereas the portion or portions of the filament having a relatively higher molecular weight will remain structurally intact. The melted or softened portion or portions of the filament then fuse with the portion or portions of the filament having the higher molecular weight.

Figure 2:
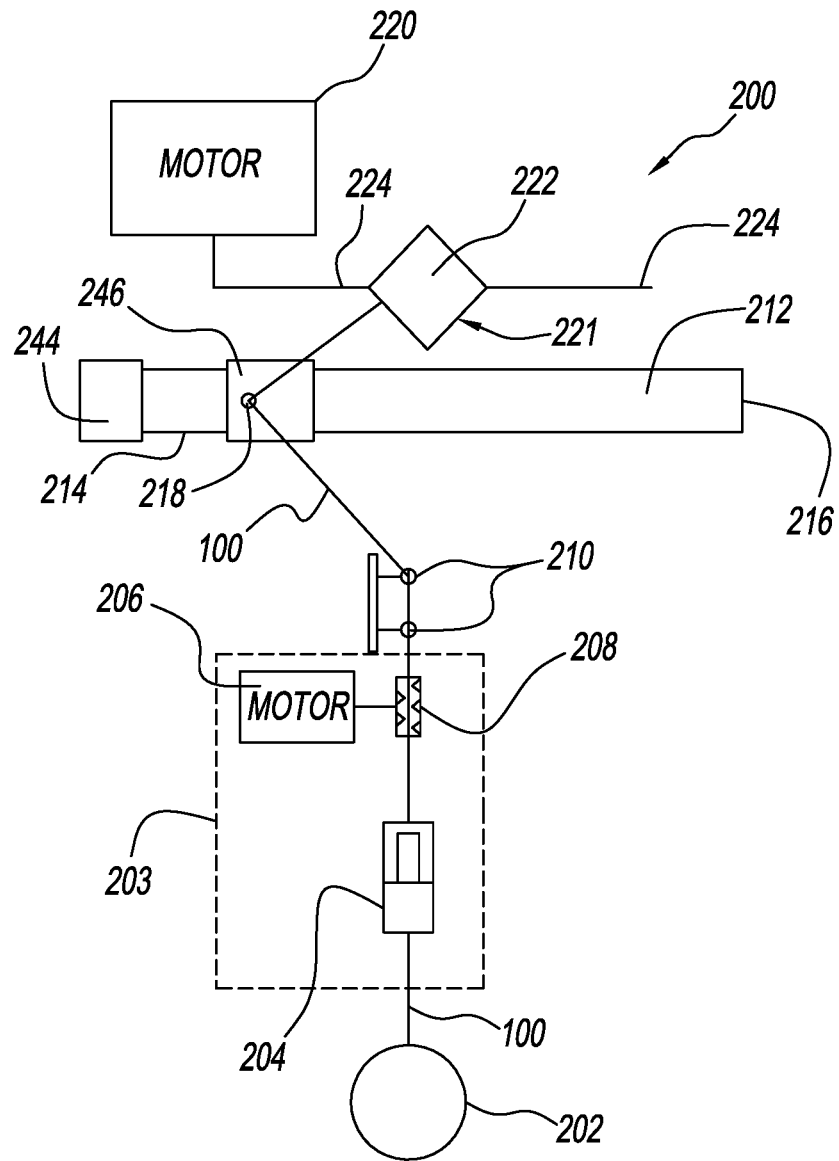
FIG. 2 shows a top view of a filament winding system, in accordance with some embodiments.

FIG. 2 shows a filament winding system 200, in accordance with a particular implementation, used to wind one or more filaments around a substrate. The filament winding system 200 is shown to include a filament, taken to be the filament 100 for described embodiments, a filament feeding apparatus 202, a tensioning subsystem 203, filament guides 210, a filament guide 218, a transport carriage 246, a track 212 having a first side 214 and a second side 216, a motor 244, a substrate 221 having a first side 222 and a second side 225, a rotating substrate mounting structure 224, and a motor 220. The tensioning subsystem 203 is shown to include a tensioner 204, a tensioner 208, and a motor 206.

A limited number of system components 100, 202, 204, 206, 208, 210, 218, 244, 246, 221, 224, 220 are shown within the filament winding system 200 for ease of illustration. Other embodiments may include a lesser or greater number of components in a filament winding system. Moreover, other components needed for a commercial embodiment of a filament winding system that incorporates the components 100, 202, 204, 206, 208, 210, 218, 244, 246, 221, 224, 220 shown for the filament winding system 200 are omitted from FIG. 2 for clarity in describing the enclosed embodiments. In other embodiments, filament winding systems may include different components that perform the functionality described herein with reference to the filament winding system 200.

The filament feeding apparatus 202 provides a filament, shown to be the filament 100, for the filament winding system 200. In one embodiment, the filament feeding apparatus 202 includes a spool of the filament 100 that supplies the filament 100 as the spool rotates. In another embodiment, the filament feeding apparatus 202 includes a filament-forming component that forms and extrudes the filament 100. For a different embodiment, the filament feeding apparatus 202 includes a strand integrating component that twists or weaves individual strands of material together into a filament used by a filament winding system 200.

As shown, the filament 100 supplied by the filament feeding apparatus 202 passes through the tensioning subsystem 203. The tensioning subsystem 203 takes up slack and introduces an adequate amount of tension in the filament 100 so that the filament 100 does not slip or move in an unwanted manner as the filament 100 is being wound around the substrate 221. The components 204, 206, 208 of the tensioning subsystem 203 are described with reference to FIG. 3.

Figure 3:
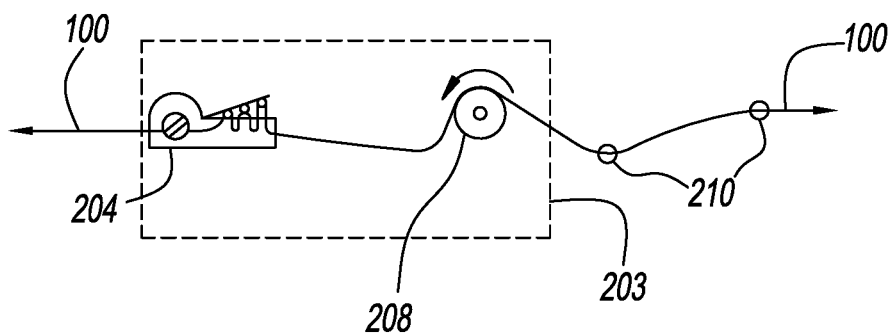
FIG. 3 shows a side view of a tensioning apparatus for a filament winding system, in accordance with some embodiments.

In FIG. 3, the filament 100 runs from the filament feeding apparatus 202 to the tensioner 204, shown to be an alligator tensioner. From the alligator tensioner, the filament 100 runs to the tensioner 208, shown to be a hysteresis tensioner pulley. Examples of alligator tensioners and hysteresis tensioner pulleys are offered by Eldon Specialties Incorporated of Graham, N.C., and other suppliers of textile machinery parts.

In one embodiment, the tensioner 208 includes a wheel driven by the motor 206. The wheel rotates in a direction opposite to the direction in which the filament 100 is being fed, as indicated by the arrow depicted above the tensioner, thereby imparting tension to the filament 100, which is in contact with the wheel. In another embodiment, a wheel of the tensioner 208 includes a clutch and rotates in the direction the filament 100 moves. Under sufficient torque applied to the wheel by the filament 100, the clutch breaks, allowing the wheel to rotate. The filament 100 in contact with the wheel is then fed forward under tension as the wheel rotates. For a different embodiment, the filament 100 is fed between two wheels that rotate against one another. When tension in the filament 100 is greater than a turning resistance of the wheels, the wheels rotate to feed out the filament 100.

From the tensioning subsystem 203, the filament 100 passes through the filament guides 210. As shown in FIG. 2, the filament guides 210 allow for a change in direction for the filament 100 between the tensioning subsystem 203 and the transport carrier 246. From the filament guides 210, the filament runs through the filament guide 218 attached to the transport carrier 246, which again changes the direction of the filament 100 so the filament 100 is incident upon the substrate 221 around which the filament 100 is wound.

For a number of embodiments, a substrate is substantially flat, meaning a thickness of the substrate in a first dimension measures less than half of the greatest width of the substrate in a second dimension. In some embodiments, a substrate is shaped as a closed plane curve, meaning a profile of the substrate, associated with an edge of the substrate, bends around smoothly and continuously until its joins on itself. Examples of closed plane curves include circles, ellipses, and ovals. In other embodiments, a substrate is shaped as a polygon, meaning a profile of the substrate is made of straight lines, associated with edges of the substrate, forming a closed shape. For several embodiments, a substrate has a closed profile which includes both curved edges and straight edges.

Substrates can be symmetrical or asymmetrical. "Symmetrical" means having similar shaped and arranged parts corresponding to one another about or across an axis or plane, respectively. "Asymmetrical" means having parts that fail to correspond to one another in shape, size, or arrangement about or across an axis or plane, respectively.

The substrate 221, representing a symmetrical polygon-shaped substrate, is held by the substrate mounting structure 224, which is coupled to the motor 220. For one embodiment, the substrate mounting structure 224 is a rotatable shaft to which the substrate 221 is secured. When the motor 220 rotates the shaft, the secured substrate 221 rotates as well. The filament 100 is fastened to the substrate 221, so that as the substrate 221 rotates, the substrate 221 pulls the filament 100 onto itself, and additional amounts of the filament 100 are pulled from the filament feeding apparatus 202.

The transport carriage 246, to which the filament guide 218 is attached, moves back and forth between the ends 214, 216 of the track 212 under the control of the motor 244. The changing linear position of the transport carriage 246 in relation to the changing angular position of the substrate 221 as both the transport carriage 246 and the substrate 221 are moving guides the filament 100 onto the substrate 221 as the filament 100 is being wrapped around the substrate 221. Therefore, the relative position between the transport carriage 246 and the substrate 221 as a function of time controls the pattern of the filament windings around the substrate 221.

The movement of the transport carriage 246 is synchronized with the movement of the substrate 221 differently for different embodiments. In a first embodiment, for which the motor 244 is absent, the motor 220 drives both the rotational movement of the substrate 221 and the translational movement of the transport carriage 246. A first set of gears is selected to couple the motor 220 to the substrate mounting structure 224, and a second set of gears is selected to couple the motor 220 to the transport carriage 246. A gear ratio between the first and second sets of gears controls the relative movement between the transport carriage 246 and the substrate 221.

In a second embodiment, the motor 220 is a stepper motor that rotationally advances the substrate 221 in 180 degree increments. Each time the substrate 221 flips, the tension of the filament 100 on an edge of the substrate 221 holds the filament 100 in place at the edge of the substrate 221 as the transport carriage 246 moves to the opposite end of the track 212 from where it was previously located. Movement of the transport carriage 246, for example, can be initiated by a switch actuated by the flipping of the substrate 221.

For a third embodiment in a non-exhaustive list of embodiments, a controller controls the relative position between the transport carriage 246 and the substrate 221 in time by sending control signals to both the motor 244 and the motor 220. The controller can be coupled with a computer capable of running programs. In this way, software executed by the computer can provide for different winding patterns of the filament 100 around the substrate 221.

Examples of computer code for winding a filament around a substrate in accordance with the teachings herein include a filament winder pseudo code and an actual prototype Matlab code appended to the present specification.

Figure 4:
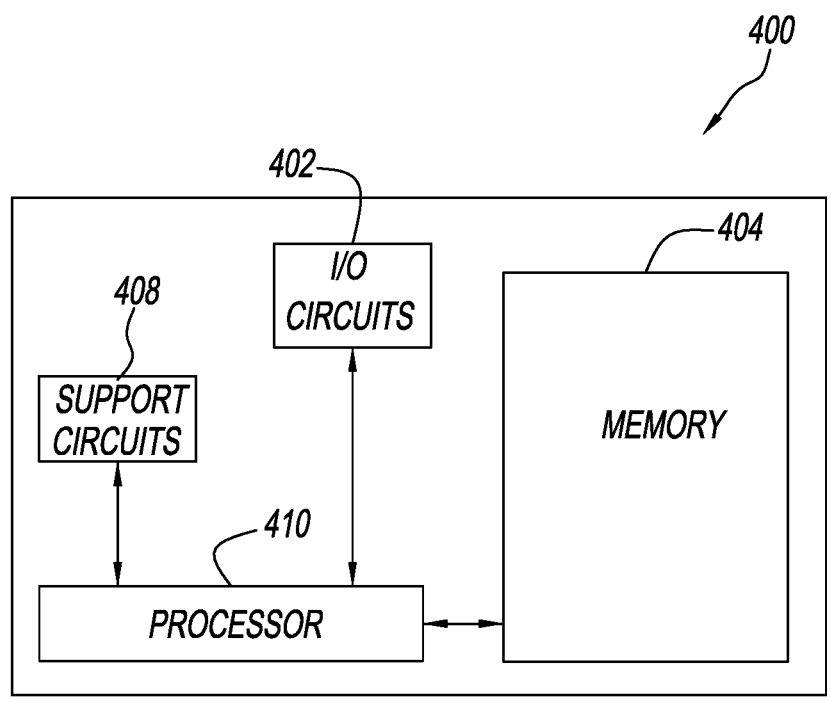
FIG. 4 shows a block diagram of a computer used with a filament winding system, in accordance with some embodiments.

FIG. 4 shows, with a high level of abstraction, a block diagram of a computer 400 used with a filament winding system, such as the filament winding system 200. The computer 400 is also referred to as a processing device. Included within the computer 400 are a processor 410, memory 404, input and output (I/O) circuits, and support circuits 408. A limited number of components 402, 404, 408, 410 are shown for the computer 400 for ease of illustration. Other embodiments may include a greater number of components and/or different components from those shown in FIG. 4.

The processor 410, for instance, includes arithmetic logic and control circuitry necessary to perform the digital processing, in whole or in part, for the computer 400 to facilitate winding one or more filaments around a substrate and to perform functionality in accordance with described embodiments for the present teachings. For one embodiment, the processor 410 represents a primary microprocessor, also referred to as a central processing unit (CPU), of the computer 400. For example, the processor 410 can represent an application processor. In another embodiment, the processor 410 is an ancillary processor, separate from the CPU, wherein the ancillary processor is dedicated to providing the processing capability, in whole or in part, ° needed for the components 402, 404, 408 of the computer 400 to perform at least some of their intended functionality.

The memory 404 provides storage of electronic data used by the processor 410 in performing its functionality. For example, the processor 410 can use the memory 404 to load programs and/or store files associated with winding one or more filaments around a substrate. In one embodiment, values held in the memory 404 dictate the relative movements between the transport carriage 246 and the substrate 221 for different winding patterns. For another embodiment, this information is calculated by the processor 410 using one or more equations held in the memory 404.

In one embodiment, the memory 404 represents random access memory (RAM). In other embodiments, the memory 404 represents volatile or non-volatile memory. For a particular embodiment, a portion of the memory 404 is removable. For example, the processor 410 can use RAM to cache data while it uses a micro secure digital (microSD) card to store files associated with functionality performed in conjunction with winding one or more filaments around a substrate.

One or more I/O circuits 402 allow for communication between the computer 400 and other electronic devices, such as one or more controllers, configured to interact with the computer 400 as part of the computer 400 performing its described functionality. These other devices, for example, can control the motors 220, 244 and/or control the processing of filament windings into a composite material. The computer 400 can also exchange signaling with additional electronic devices to initiate functionality performed by those additional devices.

Support circuitry, such as power supplies, clock circuits, and the like, assist the processor 410 and the other components 402, 404 in performing their described functionality. A power supply, for example, represents a power source that supplies electric power to the components 402, 404, 408, 410, as needed, during the course of their normal operation. The power is supplied to meet the individual voltage and load requirements of the device components 402, 404, 408, 410 that draw electric current. For some embodiments, the power supply is a wired power supply that provides direct current from alternating current using a full- or half-wave rectifier. For other embodiments, the power supply is a battery that powers up and runs the computer 400. For a particular implementation, the battery is a rechargeable power source. In another implementation, the battery is simply replaced when it no longer holds sufficient charge.

Figure 5:
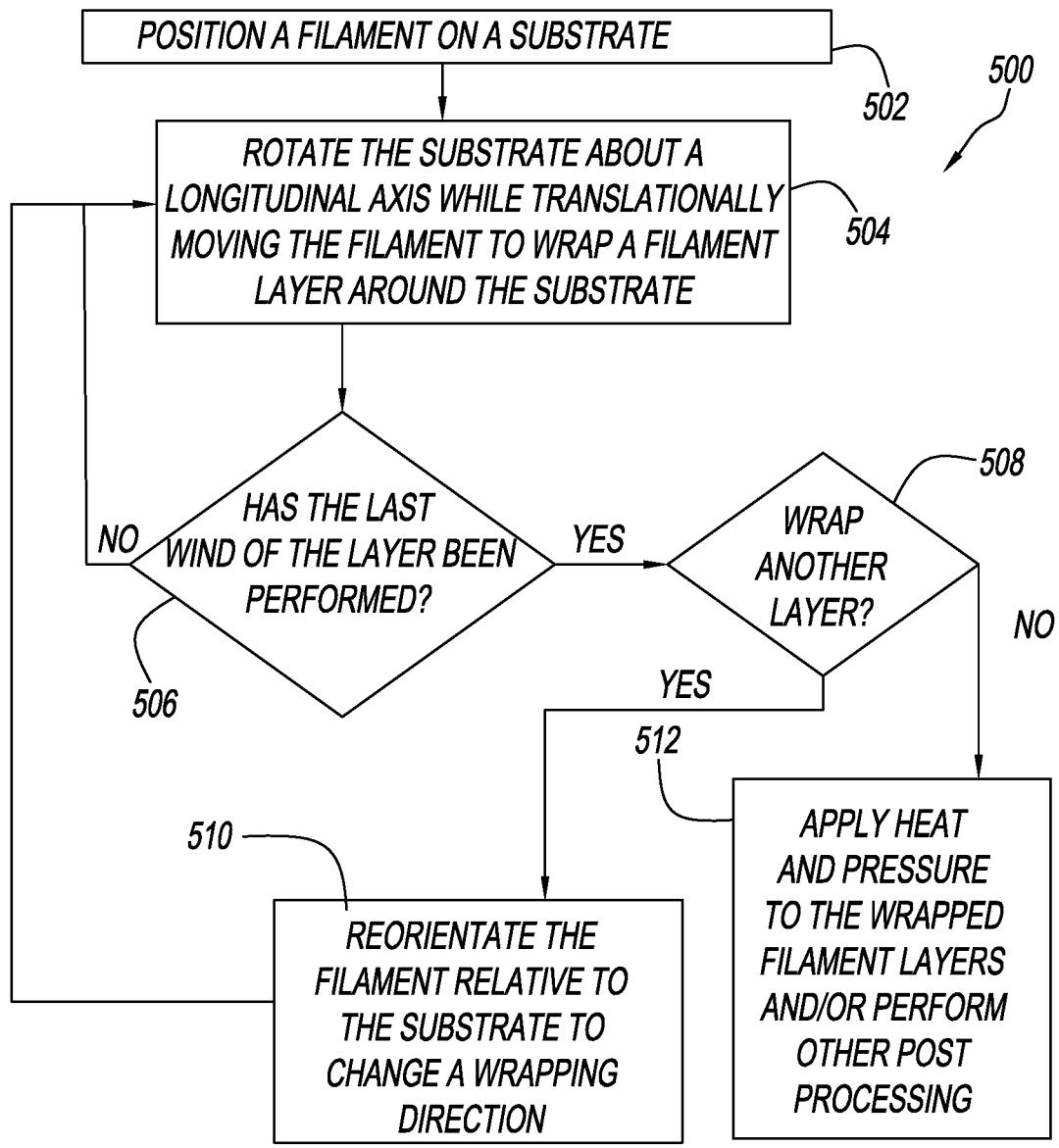
FIG. 5 shows a logical flow diagram illustrating a method of operation for a filament winding system, in accordance with some embodiments.

FIG. 5 shows a logical flow diagram illustrating a method 500 of operation for a filament winding system. The method 500, or another method of operation consistent with the teachings herein, for example, is performed with the aid of the computer 400 or a functionally equivalent processing device. The method 500, described with reference to the filament winding system 200, begins with positioning 502 the filament 100 on the substrate 221. A first end of the filament 100 is fastened to the substrate 221 at a position where the winding of the filament 100 around the substrate 221 is to begin. The filament 100 is fastened at or near one side of the substrate 221, for example, and the winding of the filament 100 progresses toward an opposite side of the substrate 221.

In a first embodiment, the first end of the filament 100 is fastened to the substrate 221 using an adhesive or tacky material. The windings to follow then help hold the first end of the filament 100 in place. In a second embodiment, an edge of the substrate 221 is slotted or has a small hole. The filament 100 is passed through the slot or hole, and a stopper knot in the filament 100 on a back side of the slot or hole holds the first end of the filament 100 in place. In a third embodiment, a screw, clip, clamp, or similar device is used to fasten the first end of the filament 100 to the substrate 221. In some instances, the screw, clip, clamp, or similar device is removed after there are enough overlapping windings to hold the first end of the filament 100 in place. In additional embodiments, different means of fastening the first end of the filament 100 to the substrate 221 are used.

The method 500 continues with the motor 220 rotating 504 the substrate 221, via the substrate mounting structure 224, about a longitudinal axis of the substrate 221 while translationally moving the filament 100 to wrap a filament layer around the substrate 221. With the substrate 221 having a substantially rectangular shape, for example, the longitudinal axis passes through or near diagonally opposite corners of the substrate 221 rather than being parallel to any edge of the substrate 221.

As the substrate 221 turns, the transport carriage 246 moves back and forth to guide the filament 100 onto the rotating substrate 221 so that the filament windings run substantially parallel to a first set of two parallel edges of the substrate 221. As the first filament layer is wrapped, individual windings of the filament 100 proceed from one edge of the first set of parallel edges (the edge at or near which the first end of the filament 100 was fastened) to the other edge of the first set of parallel edges.

For each wind of the filament 100 around the substrate 221, the computer 400 executing a winding program, for example, determines 506 if the wind is a last wind of a current filament layer surrounding the substrate 221. If the wind is not the last wind of the filament layer, the filament winding system 200 performs 504 another wind of the filament 100 around the substrate 221 and then makes the determination 506 again. If the wind is the last wind of the filament layer, the computer 400 determines 508 if another layer should be wrapped around the substrate 221.

If the computer 400 determines 508 that another layer will be wrapped around the substrate 221, the computer 400 directs one or more controllers, for example, to have the filament winding system 200 reorientate 510 the filament 100 relative to the substrate 221 to change a winding orientation, which is also referred to as a winding direction or simply as an orientation. Reorientating 510 the filament 100 relative to the substrate 221 is done without having to remove the substrate from 221 from the substrate mounting structure 224. After the filament 100 is reorientated relative to the substrate 221, the filament winding system 200 proceeds to wind the filament 100 around the substrate 221 to put down the next filament layer. For one embodiment, the winding direction is changed by 90 degrees so that as a second filament layer is wrapped over the first filament layer, individual filament windings for the second filament layer proceed from one edge of a second set of parallel edges to the other edge of the second set of parallel edges.

In various embodiments, the angle between the orientation of filament windings in one layer and the orientation of filament windings in an adjacent layer can be any angle between zero and 180 degrees. A filament winding in any layer need not be perpendicular to any combination of edges of the substrate 221 that the filament winding winds around. Further, a filament winding in any layer need not be parallel to any combination of edges of the substrate 221 that the filament winding does not wind around.

If the computer 400 determines 508 that the last filament layer has been wrapped around the substrate 221, the winding of the filament 100 around the substrate 221 stops. The wrapped filament layers are then processed, for example, with the application 512 of heat and/or pressure, into a composite material. For some embodiments, the substrate 221 is processed with the wrapped filament layers and forms part of the resulting composite material. In other embodiments, the substrate 221 is removed from the wrapped filament layers before the wrapped filament layers are processed into a composite material. The processing of wrapped filament layers into a composite material is described in detail with respect to FIGS. 13 and 14.

Figure 6:
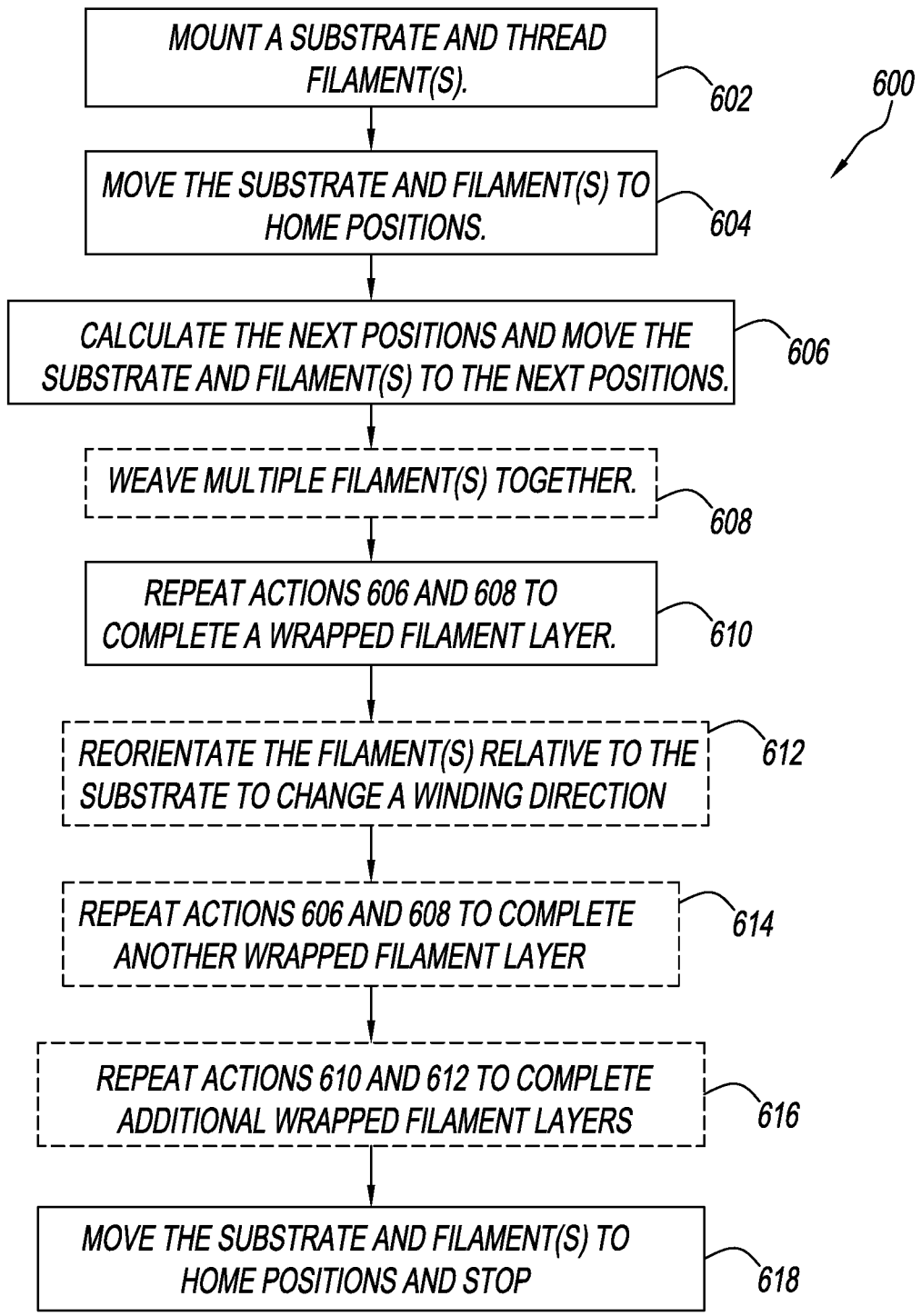
FIG. 6 shows a logical flow diagram illustrating a method of operation for a filament winding system, in accordance with some embodiments.

FIG. 6 shows another logical flow diagram illustrating a method 600 of operation for a filament winding system. The method 600, or another method of operation consistent with the teachings herein, for example, is performed with the aid of the computer 400 or a functionally equivalent processing device. The method 600 is described with reference to the filament winding system 200 and FIGS. 7-12. For clarity in describing presented embodiments, FIGS. 7-12 specifically identify four edges 736, 740, 738, 734, four corners 730, 728, 732, 726, and the first 222 and second 225 sides of the substrate 221. Further, FIGS. 7-12 show the substrate 221 as being substantially square in shape with individual filament windings running either perpendicular or parallel to the four edges 736, 740, 738, 734.

In variations on embodiments described with reference to the substrate 221, one or more of the corners 730, 728, 732, 726 of the substrate 221 can be radiused, curved, or rounded and still be defined as "corners." Further, one or more of the edges 736, 740, 738, 734 of the substrate 221 can be curved and still be defined as "edges." An edge profile for a substrate lacking straight edges and/or sharp corners, for example, is considered to have edges and corners when a direction of the profile changes by a substantially greater amount over a shorter distance (i.e., a corner) as compared to where the direction of the profile changes by a substantially lesser amount over a greater distance (i.e., an edge). For such variations, for instance, the filament 100 can still be wound around a substrate having one or more curved edges and/or corners as described with reference to FIGS. 7-12.

Figure 7:
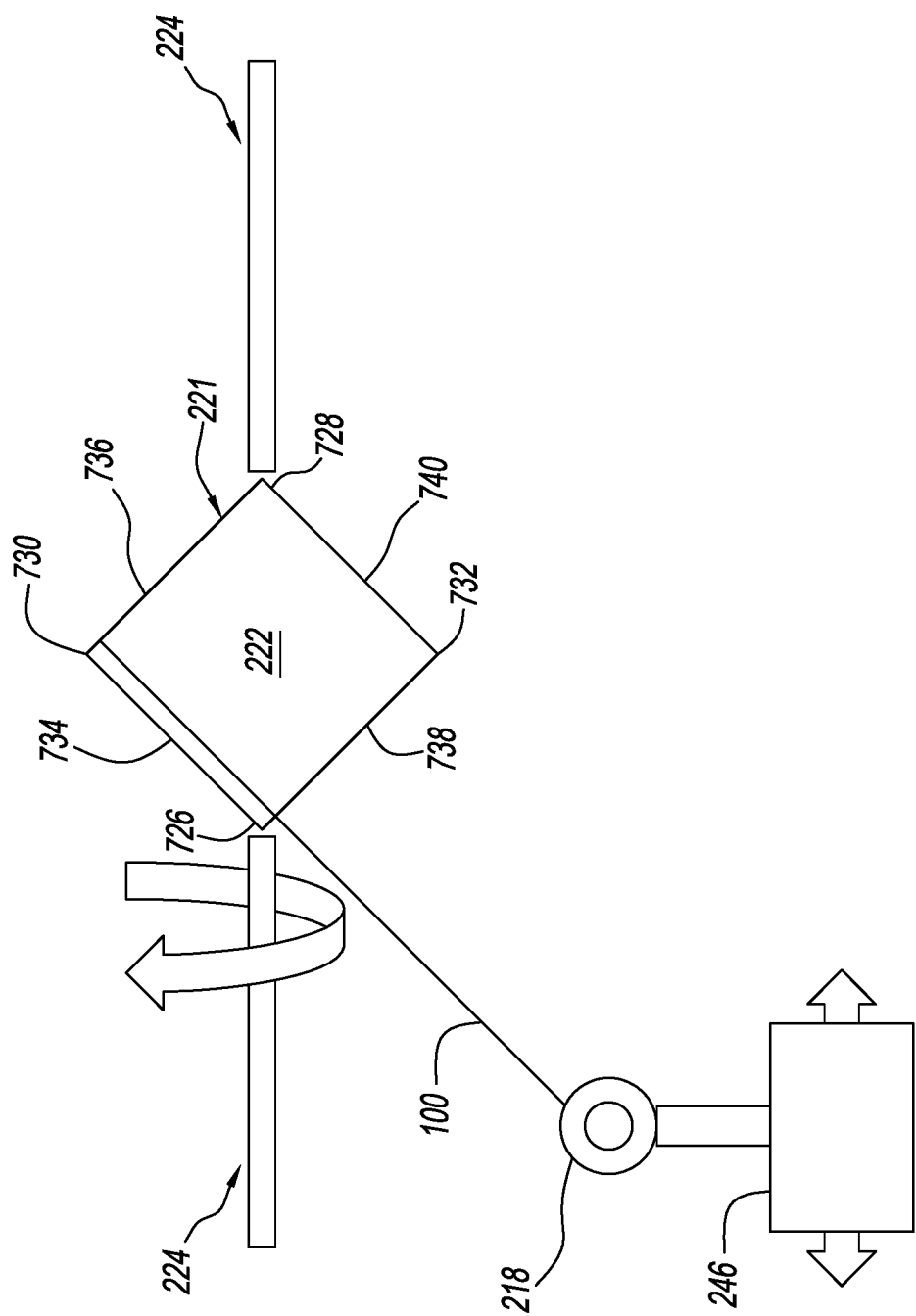
FIG. 7 shows a filament winding system with a substrate and transport carriage in a first relative position, in accordance with some embodiments.

The method 600 begins with mounting 602 a substrate, described in terms of the substrate 221, and threading 602 a filament, described in terms of the filament 100. This is illustrated by FIG. 7. FIG. 7 shows the corner 726 of the substrate 221 mounted to a first end of a first part of the substrate mounting structure 224. A second end of the first part the substrate mounting structure 224 is coupled to the motor 220. The corner 728 of the substrate 221 is mounted to a first end of a second part the substrate mounting structure 224. A second end of the second part of the substrate mounting structure 224 is rotationally coupled to a supporting structure, such as a frame element of the filament winding system 200.

For one embodiment, the first ends of the first and second parts of the substrate mounting structure 224 have chuck clamps with radically symmetric jaws to facilitate keeping the mounted substrate 221 properly centered and balanced with the rotating substrate mounting structure 224. In other embodiments, different types of screws, clamps, clips, ties, retaining pins, or the like are used to mount the substrate 221 to the rotatable substrate mounting structure 224.

From the filament feeding apparatus 202, the filament 100 is threaded 602 through the tensioning subsystem 203, as shown in FIG. 3, and through the filament guides 210, as shown in FIG. 2. From the filament guides 210, the filament 100 is threaded through the filament guide 218 attached to the transport carrier 246, as shown in FIG. 7, and fastened to the substrate 221, as described for the method 500.

The method 600 continues with moving 604 the substrate 221 and the filament 100 to their home positions. The substrate is rotationally brought to its home position by the motor 220 rotating the substrate mounting structure 224 to which the substrate 221 is mounted. The filament 100 is brought to its home position by the motor 244 translating the transport carrier 246 to which the filament guide 218 is attached. The home positions for the substrate 221 and the filament 100 are positions from which subsequent positions for the substrate 221 and the filament 100 are calculated, for example, by the computer 400. This helps to maintain correct alignment between the substrate 221 and the filament 100 as the filament 100 is being wound around the substrate 221.

From the home positions, the computer 400 running a winding program calculates 606 a next set of positions for the substrate 221 and the filament 100. Through the use of a controller controlling the motors 220, 244, the substrate 221 and the filament 100 are moved 606 to their next positions. These movements are repeated as the filament 100 is wound around the substrate 221 in accordance with a winding pattern determined by the winding program. For some embodiments, the substrate 221 and the filament 100 are moved continuously rather than in discrete stages.

FIG. 7 shows the filament 100 fastened to the edge 736 of the substrate 221, near the corner 730. The filament 100 then runs over the first side 222 of the substrate 221, near and parallel to the edge 734, to the filament guide 218. The transport carriage 246, to which the filament guide 218 is attached, is positioned toward the first end 214 of the track 212, beyond (to the left of, as shown) the corner 726. For an embodiment, FIG. 7 shows the home positions of the substrate 221 and the filament 100.

Figure 8:
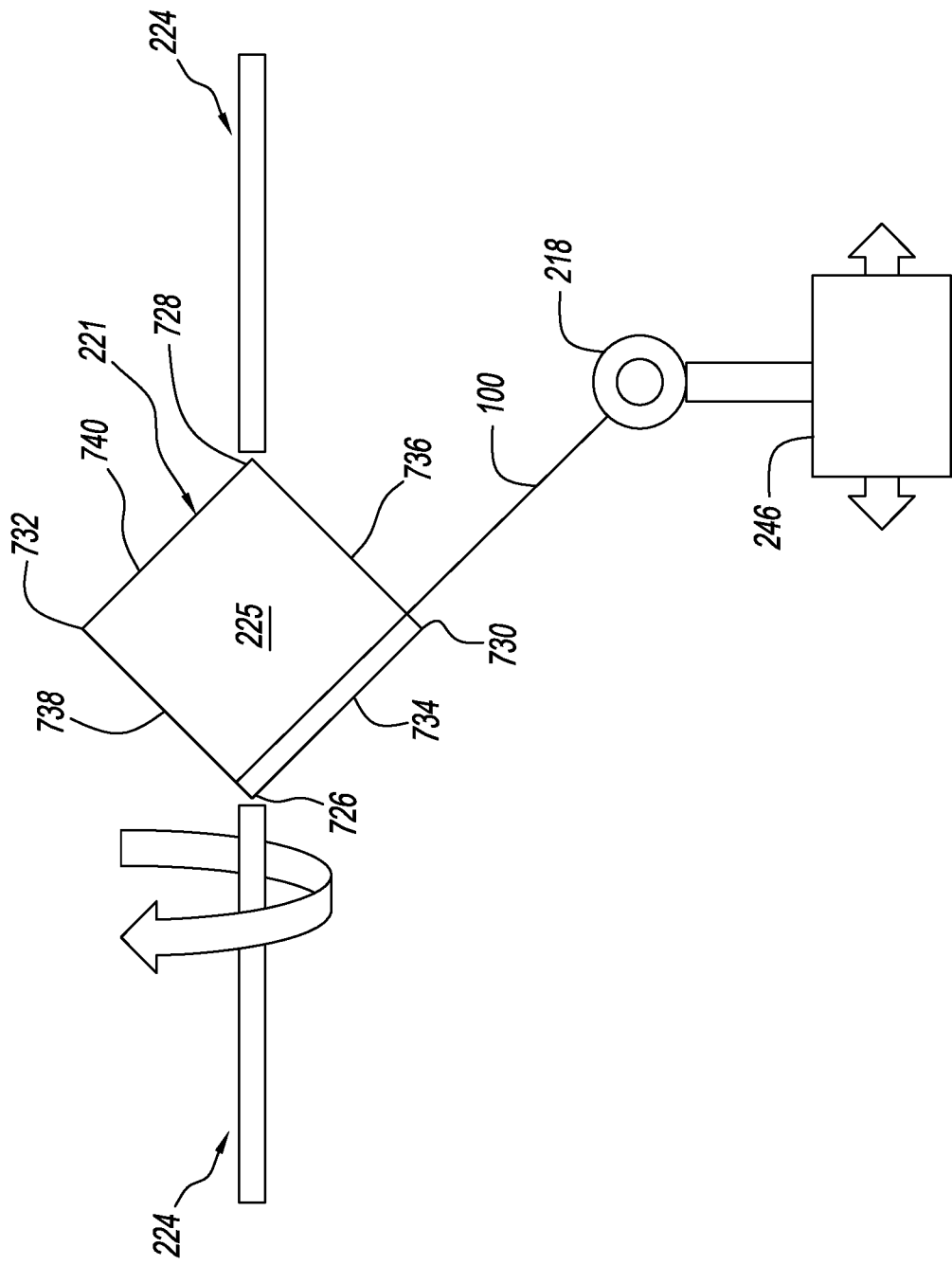
FIG. 8 shows a filament winding system with a substrate and transport carriage in a second relative position, in accordance with some embodiments.

The substrate mounting structure 224 then rotates the substrate 221 to its next position. As illustrated in FIG. 7, the substrate 221 is rotated about its mounted corners 726, 728 so that the corner 730 is rotated into the page and the corner 732 is rotated out of the page. For an embodiment, the substrate is flipped from the first-side-up 222 position shown in FIG. 7 to a second-side-up 225 position, shown in FIG. 8. FIG. 8 also shows the transport carrier 246 in its next position, toward the second end 216 of the track 214, beyond (to the right, as shown) the corner 730. The transport carriage 246 moves to keep the filament 100 parallel to the edge 734 as flipping the substrate 221 reorientates the edge 734 from a positive-slope orientation, as presented in FIG. 7, to a negative-slope orientation, as presented in FIG. 8.

As the substrate 221 is flipped from its first-side-up 222 position shown in FIG. 7, the filament passes around the edge 738. Tension in the filament 100 keeps the filament 100 from slipping along the edge 738 as the substrate 221 is rotated. This is also the case for embodiments (not shown) in which the filament 100 makes an angle of less than or greater than 90 degrees with the edge 738. Completing the rotational flip of the substrate 221 together with the translation of the transport carriage 246, as shown in FIG. 8, completes the first wind of the filament 100 around the substrate 221. Additional flips of the substrate 221 and synchronized translations of the transport carriage 246 result in additional windings.

Figure 9:
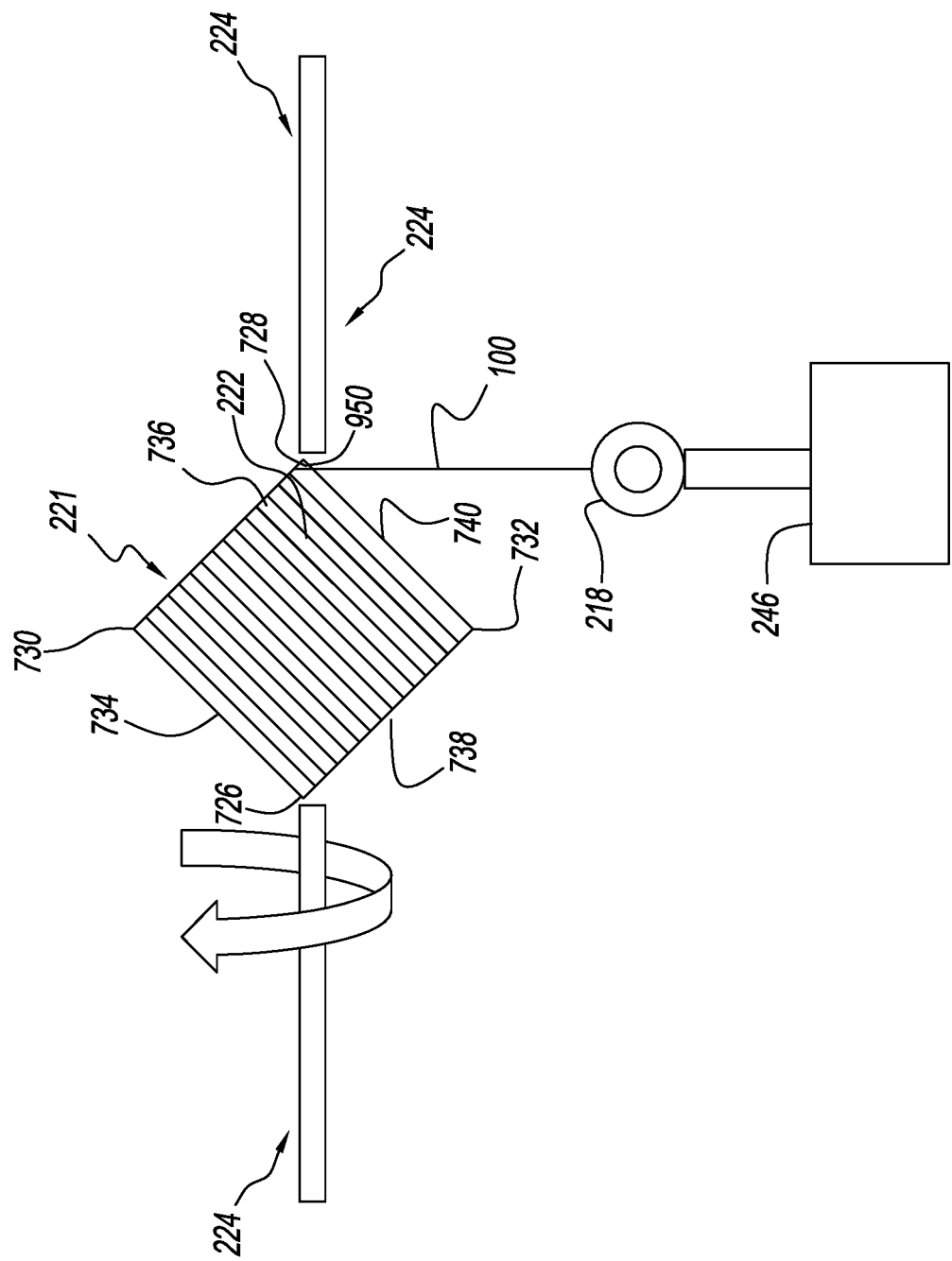
FIG. 9 shows a filament being reorientated relative to a substrate for a filament winding system, in accordance with some embodiments.

By repeatedly calculating and executing position changes for the substrate 221 and the filament 100, a wrapped filament layer is completed 610. FIG. 9 shows the multiple windings of a first completed filament layer. As pictured, the individual windings of the first filament layer, which are parallel to the sides 734 and 740, begin near the edge 734 and progress toward the edge 740. For an embodiment (not pictured), the filament windings of a second layer are wound parallel to and between the filament windings of the first layer. The individual windings of the second filament layer, for example, would begin near the edge 740 and progress back toward the edge 734.

With the first wrapped filament layer completed, the method 600 includes the option of reorientating 612 the filament 100 relative to the substrate 221 to change the winding direction and wrap 614 another filament layer around the substrate 221. This is also shown in FIG. 9. With the last wind of the first layer placing the filament 100 on the second side 225 of the substrate 221 at the edge 736, the transport carriage is left positioned under (as pictured) the corner 728, so as the substrate 221 flips, the filament 100 undergoes a half wind about the corner 728 on the first side 222 of the substrate 221 as shown.

This half wind 950, or odd number of half winds, (also referred to as a corner winding) about the corner 728 reorientates the filament 100, which is now positioned on the edge 740 of the substrate 221. By now winding the filament 100 around the edges 740 and 734, individual windings for the second filament layer will be perpendicular to the windings in the first filament layer. For various embodiments, having substrates with different shapes allows for different edge orientations and different angles between the windings of adjacent filament layers.

For some embodiments, turning the filament 100 about a corner of the substrate 221 means turning the filament 100 about a first end of the first or second parts of the substrate mounting structure 224. This is because the first ends of the substrate mounting structure 224, to which the substrate 221 is mounted, can sometimes overlap or cover one or more corners of the substrate 221.

Figure 10:
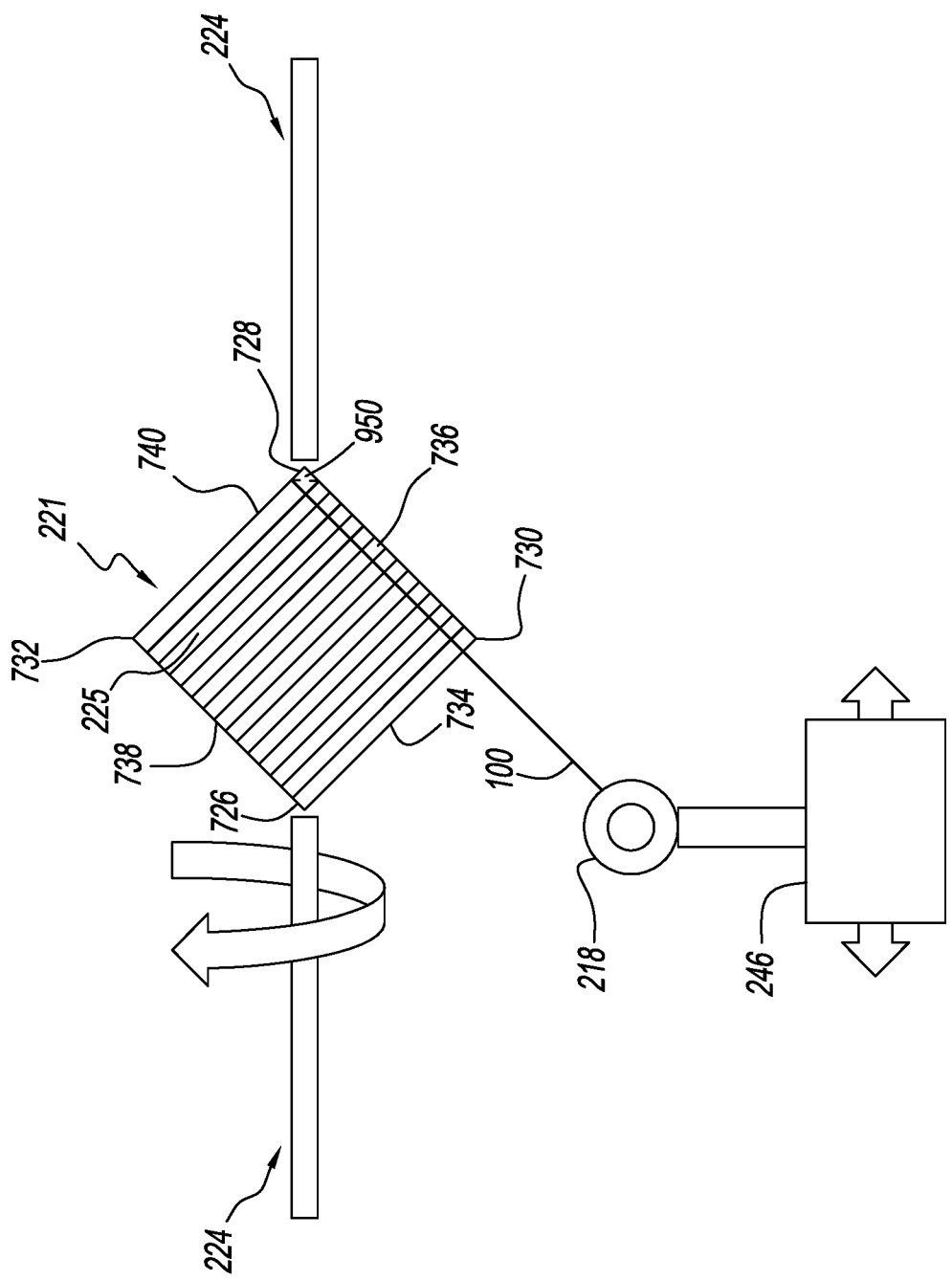
FIG. 10 shows a completed reorientation of a filament relative to a substrate for a filament winding system, in accordance with some embodiments.

FIG. 10 shows the next flip of the substrate 221 from the position shown in FIG. 9. As the substrate 221 flips to its second-side-up 225 orientation, the corner winding 950 rotates behind the visible side of the substrate 221, and is thus shown with a broken line. The filament 100 comes around the edge 740, and the transport carriage 246 pulls the filament 100 toward the first end 214 of the track 212 (to the left of the corner 730, as shown) so the filament 100 is wound around the second side 225 of the substrate 221 parallel to the edge 736.

The windings for the second filament layer are repeated 614. Each new winding is spaced incrementally, with a settable spacing, from the last winding so the windings progress in a lateral direction (a direction perpendicular to the direction of the filament 100) from the edge 736 to the edge 738. Completion of the windings laterally across the substrate 221 from the edge 736 to the edge 738 completes 614 the second wrapped fiber layer. When complete, the windings of the second filament layer crisscross the windings of the first filament layer.

The method 600 continues with the computer 400 determining whether or not to wrap one or more additional filament layers. If the filament winding system 200 proceeds to wrap a third filament layer, for example, the filament 100 is wound around the corner 726 to change the orientation of the filament 100 with respect to the substrate 221. The individual windings of the third filament layer are then run parallel to the edges 734 and 740, as they were for the first filament layer. In some cases, every filament layer or multiple filament layers are wound around the substrate using a single length of continuous filament 100 dispensed by the filament feeding apparatus 202.

The directionality of the filament windings in the three filament layers can be represented by a set of three numbers [0/90/0]. The first number, 0, sets the direction of the filament windings in the first layer as a reference direction. The second number, 90, indicates the filament windings in the second layer run perpendicular to (make an angle of 90 degrees with) the filament windings in the first layer. The third number, 0, indicates the filament windings in the third layer run parallel to (make an angle of 0 degrees with) the filament windings in the first layer.

In some embodiments, the filament windings of the first filament layer are not perpendicular with the edges 736 and 738. The windings, for example, make an angle of 75 degrees with the edges 736 and 738. Further, the filament windings of any layer need not be perpendicular with the filament windings of the previous or following layer. In a first example, the winding orientations of six filament layers are indicated by the set of numbers [0/45/90/90/45/0]. Here, the third and fourth filament layers are wound in the same direction, which is perpendicular to the direction of the filament windings in the first filament layer. A corner winding, for instance, is not used between the third and fourth filament layers. In a second example, the winding orientations of four filament layers are indicated by the set of numbers [0/75/25/75].

For an embodiment, the substrate mounting structure 224 moves both rotationally and translationally. The motor 220, for example, rotates the substrate mounting structure 224 while another motor moves the substrate mounting structure 224 back and forth to guide the filament 100 onto the rotating substrate at different angles of incidence. In such an implementation, the translational movement of the substrate mounting structure 224 controls the relative lateral position between the filament 100 and the rotating substrate 221. The transport carriage 246, for instance, can remain stationary. The filament guide 218 attached to the transport carriage 246 does not move and simply guides the filament 100 onto the rotating and translating substrate 221.

In a number of embodiments, winding parameters controlling aspects of winding filament layers around the substrate 221 are included in winding programs for various winding patterns executed by the computer 400. Such parameters include, for example, the number of filament layers to wind, the number of windings per filament layer, the diameter of the filament 100, the spacing between windings of a filament layer, the tension in the filament 100, and the rate at which the filament 100 is wound around the substrate 221. In further embodiments, different winding parameters in different combinations control the winding of different patterns. For some embodiments, a user has the option of selecting and/or inputting winding parameters at the time a winding program initializes on the computer 400. For other embodiments, winding parameters can be stored in a look-up table. In a number of embodiments, winding parameters are calculated, interpolated, or extrapolated from empirical data.

Figure 11:
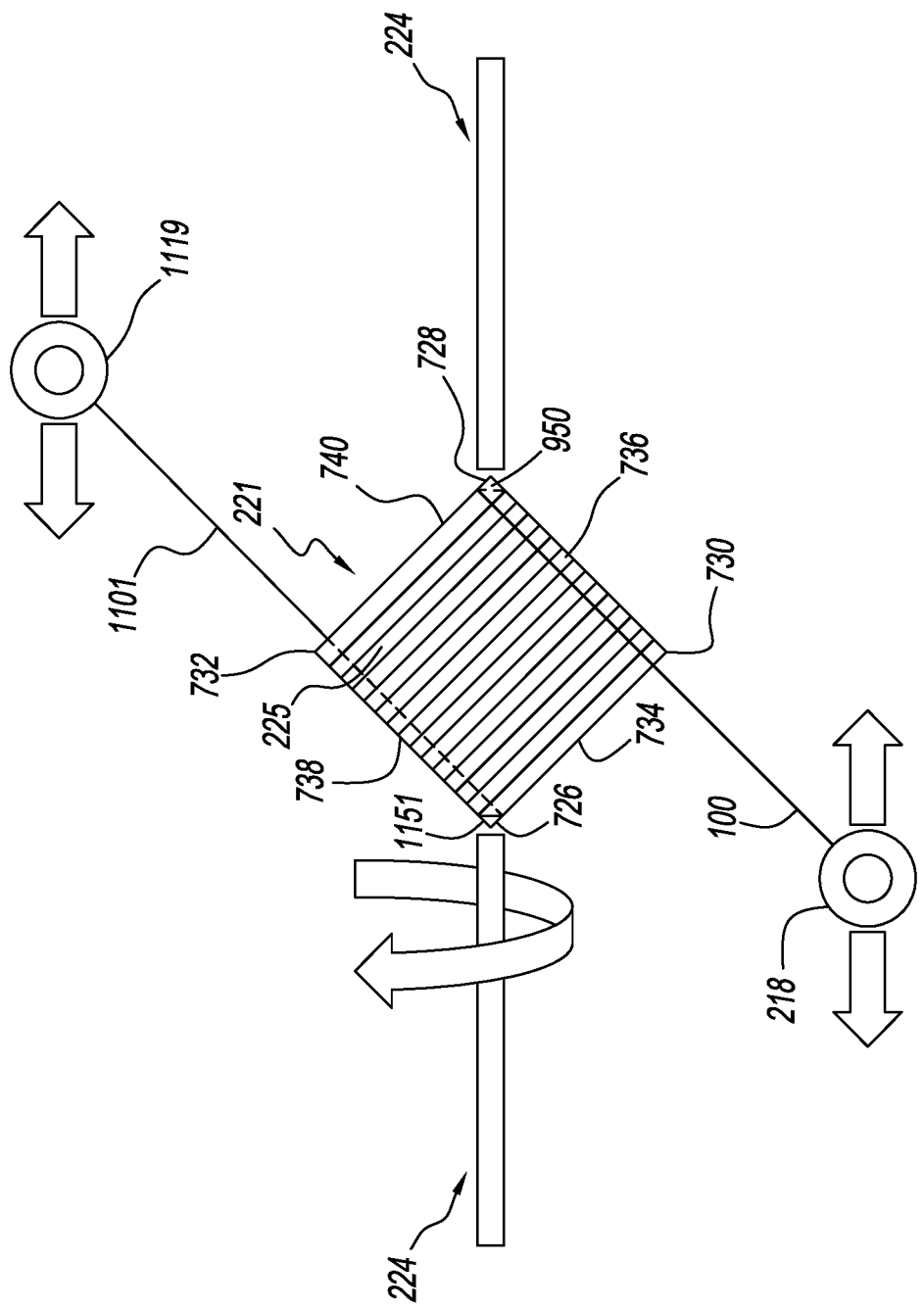
FIG. 11 shows multiple filaments being wound on a substrate for a filament winding system, in accordance with some embodiments.

For several embodiments, a filament winding system can simultaneously wind multiple filaments onto a substrate. This can decrease the time it takes to wrap filament layers around the substrate. FIG. 11, for example, shows a partial view of the filament winding system 200 modified to wind a filament 1101, in addition to the filament 100, around the substrate 221. In addition to the filament guide 218, to guide the filament 100, the modified filament winding system 200 also has a filament guide 1119, to guide the filament 1101. The modified filament winding system 200 has a separate transport carriage on a separate track (not shown) to which the filament guide 1119 is attached. For an embodiment, the separate transport carriage is moved translationally by an additional motor, which operates in conjunction with the motors 220 and 244.

As shown in FIG. 11, the filaments 100, 1101 are fastened to the substrate 221 near the center of the substrate 221. With windings parallel to the edges 734 and 740, the windings of the filament 100 progress from the center of the substrate 221 toward the edge 740, and the windings of the filament 1101 progress from the center of the substrate 221 toward the edge 734. From the edge 740, the corner winding 950 around the first side 222 of the substrate 221 reorientates the filament 100 so that windings of the filament 100 are now parallel to the edge 736. From the edge 734, a corner winding 1151 around the second side 225 of the substrate 221 reorientates the filament 1101 so that windings of the filament 1101 are now parallel to the edge 738. For the embodiment shown, the filaments 100 and 1101 are being pulled across opposite sides of the substrate 221 at any given time. In other embodiments, multiple filaments grouped together are wound together across the substrate 221 in a common direction.

Figure 12:
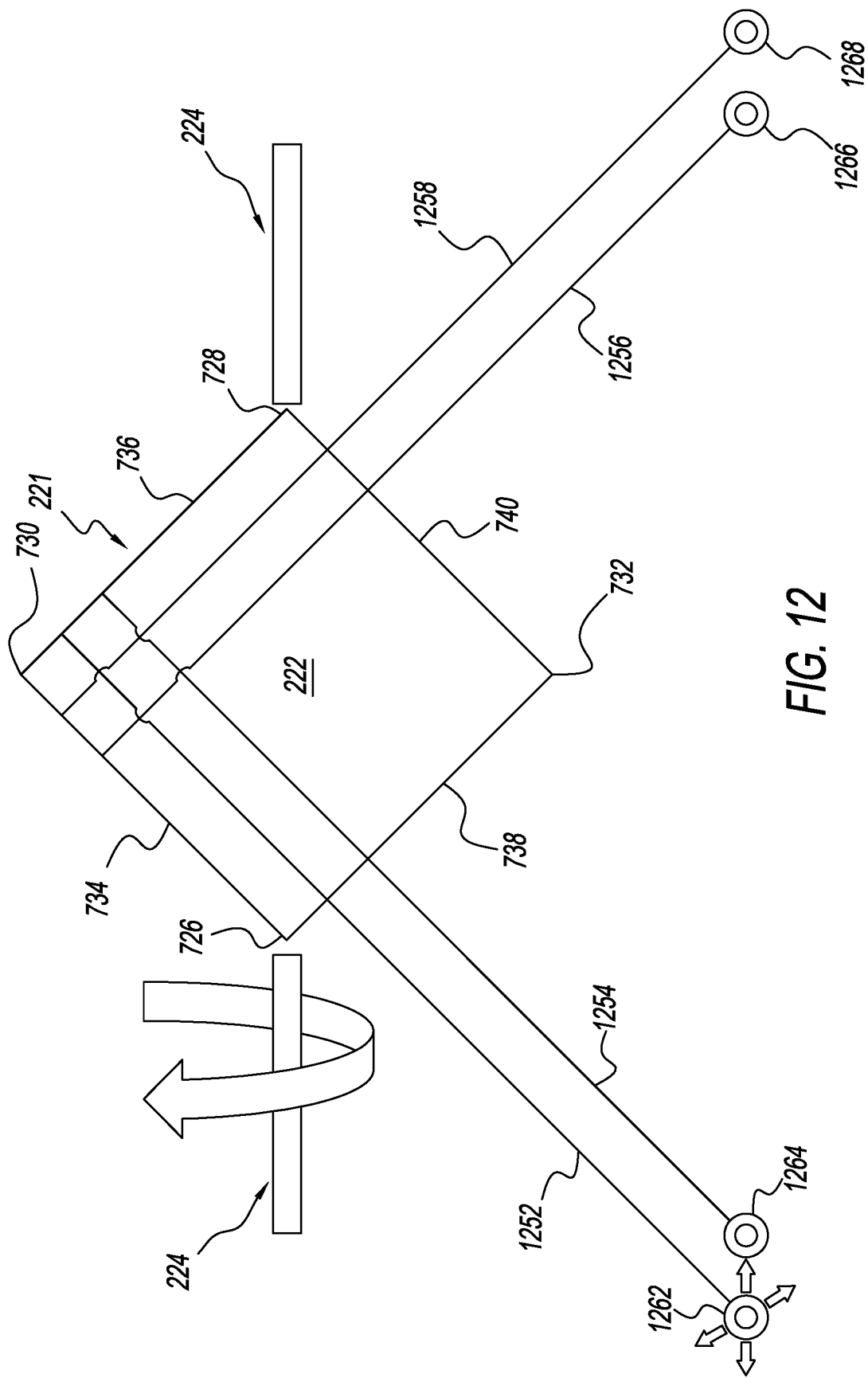
FIG. 12 shows multiple filaments being woven on a substrate for a filament winding system, in accordance with some embodiments.

The method 600 includes the option of weaving 608 filaments together when multiple filaments are being wound around the substrate 221. FIG. 12 illustrates a weave pattern for four filaments 1252, 1254, 1256, 1258 being wound around the substrate 221. The filaments 1252, 1254, 1256, and 1258 are threaded through four filament guides 1262, 1264, 1266, and 1268, respectively. The filament guides 1262, 1264, 1266, 1268 are coupled with motors and/or gearing (not shown) that allow at least some of the filament guides 1262, 1264, 1266, 1268 to move with multiple degrees of freedom, rather than just translationally. The four arrows shown for the filament guide 1262, for instance, indicate that the filament guide 1262 can move in two dimensions. This allows the filaments 1252, 1254, 1256, 1258 to be guided over or under one another to create different weave patterns, including the weave pattern shown in FIG. 12.

Filaments 1252 and 1254 are grouped together and wound parallel to the edge 734. Filaments 1256 and 1258 are grouped together and wound parallel to the edge 736. By moving some or all of the filament guides 1262, 1264, 1266, 1268 in two or more dimensions, the filament 1258 passes over the filament 1252 and under the filament 1254. As pictured, an arc in a filament indicates the filament passing over another filament. The filament 1256 passes under the filament 1252 and over the filament 1254. By continuing the pattern of alternating over and under passes, the filaments 1252, 1254, 1256, 1258 complete a woven filament layer wrapped around the substrate 221.

The method 600 ends after the filament winding system 200 wraps the last filament layer onto the substrate 221. The substrate 221 and the transport carriage 246 are then moved 618 to their home positions by the motor 220 and the motor 244, respectively. The substrate 221 can then be removed from the substrate mounting structure 224, and the wrapped filament layers can be optionally removed from the substrate 221. The wrapped filament layers are then processed, either with or without the substrate 221, into a composite material as described with respect to FIGS. 13 and 14.

FIG. 13 shows a limited cross-sectional view of a single filament layer being processed into a composite material, facilitated by pressure applied by plates 1380 of a press. A single filament layer, for example, is wrapped around a substrate having two plates stacked back-to-back. By running a blade between the plates to cut the filament windings, the filament layer which wraps around both sides of the substrate can be removed from the substrate and laid flat as a single-layer sheet.

The single-layer sheet is shown placed between the plates 1380 of the press so that filament segments, which result from the cutting the filament windings, are illustrated as concentric circular cross sections. Here the outer and inner circles represent the sheath 102 and core 104, respectively, of the filament 100 shown in FIG. 1A. In addition to the application of pressure (indicated by two horizontal rows of small arrows pointing toward the plates 1380) from the press, an amount of heat is applied to the single-layer sheet so that the sheath 102 portions of the filament segments melt and the core portions 104 of the filament segments remain intact.

The lower illustration of FIG. 13 shows the sheath 102 portions of the filament segments melted together to form a matrix in which the core portions 104 of the filament segments are integrated. For some embodiments, this single-layer composite material 1390 remains flexible or pliable enough to use as a fabric without having to be molded with additional layers into a rigid structure.

FIG. 14 shows a limited cross-sectional view of multiple filament layers processed with the substrate 221 into a composite material. The filament winding system 200, for example, wraps three filament layers around the substrate 221 in alternating orthogonal directions. The substrate 221 and the filament layers are then removed from the substrate mounting structure 224 and placed in an environment in which heat and/or pressure can be applied to the substrate 221 and the filament layers. For one embodiment, the substrate 221 and the wrapped filament layers are placed in an autoclave. For the embodiment pictured, the substrate 221 and the wrapped filament layers are placed between the plates 1380 of a press located within an oven or other enclosure so that both heat and pressure can be applied to the substrate 221 and the filament layers. For other embodiments, the substrate 221 and the wrapped filament layers are placed in different environments that allow for the application of heat and/or pressure to the substrate 221 and the wrapped filament layers.

Heat is applied to the to the substrate 221 and the wrapped filament layers to elevate their temperature to a processing temperature beyond the melting point temperature of the filament sheath 102 while keeping the processing temperature below the melting point temperature of the filament core 104. The filament sheath 102 melts for the individual windings and forms a continuous matrix 1402 in which the substrate 221 and continuously wound filament core 104 is embedded.

In another embodiment, heat is applied to the substrate 221 and the wrapped filament layers to elevate their temperature to a processing temperature near but below the melting point temperature of the filament sheath 102. This makes the filament sheath 102 soft. With the application of sufficient pressure, the soft sheath material is compressed into the continuous matrix 1402 in which the substrate 221 and the continuously wound filament core 104 is embedded.

Shown within the composite material are remnants or processed layers 1484, 1486, 1488 resulting from the three filament layers wrapped around the substrate 221 by the filament winding system 200. After processing, the first filament layer wrapped around the substrate 221 becomes the processed layer 1484. The second and third wrapped filament layers become the processed layers 1486 and 1488, respectively. For the processed layers 1484 and 1488, the filament core 104 is shown orientated so that it passes into the page. For the processed layer 1486, the filament core 104, indicated by broken lines, is shown orientated so that it runs parallel to the page.

The application of pressure to the substrate 221 and the wrapped filament layers provides a number of advantages. In a first implementation, for instance, applied pressure reduces or eliminates voids in the composite material. This makes the composite material stronger as a result of being less porous. In a second implementation, the filament 100 is constructed from one or more optically transparent materials, such as polystyrene, polypropylene, or acrylic. Pressure applied to the substrate 221 and the wrapped filament layers during processing reduces, shrinks, or eliminates air bubbles from the composite material. This results in greater transparency of the composite material.

The number and or size of air bubbles can also be reduced by performing the processing in a vacuum chamber. To further enhance the clarity of transparent composite materials, the winding of filament layers and the processing of the filament layers into composite materials can take place in a clean room to avoid or minimize impurities such as dust and other contaminants in the composite materials.

In some embodiments, multiple components of the filament have optical properties which result in windings of the filament being processed into a transparent composite material. With several embodiments, transparent composite materials are defined to include translucent composite material. In a first example, the multiple transparent components of the filament 100 all share the same or a very similar index of refraction such that a composite material formed from the filament 100 is see-through without significant visual distortion. In a second example, each components of the filament 100 is individually transparent with a different index of refraction from other components so that a composite material formed from the filament 100 is translucent and passes light, but with an appreciable amount of visual distortion.

For a particular embodiment, the substrate 221 is made from the same material as the filament sheath 102. During processing, the substrate 221 melts or softens with the filament sheath 102 and becomes part of the continuous matrix 1402 in which the continuously wound filament core 104 is embedded. In a number embodiments, the substrate 221 melts and combines with the continuous matrix 1402 but is made from a resin or other material which is different from the material making up the filament sheath 102. For other embodiments, the substrate 221 remains solid while processing the substrate 221 and its wrapped filament layers into a composite material. For some embodiments, wound composite materials can be used to make fiber reinforced transparent armors. In one embodiment, fiber reinforced transparent armor is made from a unidirectional composite material for which all the filament windings run in a single direction and are wound from a single continuous filament.

In some cases, the intact substrate 221 is left within the composite material to provide rigidity or structural reinforcement to the composite material. In other cases, the intact substrate 221 is removed from the composite material after processing. For some embodiments, non-fiber materials are added to wrapped filament layers during winding to further functionalize a composite material made from the wrapped filament layers. For example, attachment points or other hardware can be added to a composite material in this way.

To remove the intact substrate 221 from the composite material, the composite material is cut along or near one or more of the edges 734, 736, 738, 740 of the substrate 221. The substrate 221 can then be extracted from the composite material through the incision. In some instances, the composite material is cut circumferentially around the entire substrate 221. This divides the composite material into two useable parts and allows for easy removal of the substrate 221.

Polishing the substrate 221 before use facilitates the removal of the substrate 221 from the composite material in some instances. The continuous matrix 1402 does not adhere to, or adheres to with less intensity, a smooth polished surface without rough surface features to which the matrix 1402 can attach. For embodiments where the substrate 221 has two plates arranged back-to-back, only the outward-facing surfaces of the substrate 221, the faces over which the filament is wound, are polished. In different embodiments, the substrate 221 can be polished to varying degrees of smoothness. In a particular embodiment, an optical-grade polish is applied to the substrate 221, ensuring the substrate is completely smooth and level. This is useful for processing transparent composite materials for which surface fluctuations might cause visual distortion.

A high degree of polish on the substrate 221 helps ensure that the windings of the filament 100 are even and level with one another. A localized concave or convex surface feature, for example, can cause an unwanted dip or bump, respectively, in the windings. A convex surface feature can also result in the filament 100 no longer winding straight but rather bending around the surface feature. Removing abrasive surface features from the substrate 221 additionally helps ensure that the filament 100 is not abraded or severed where it comes into contact with the substrate 221.

For some embodiments, post processing occurs after a flat substrate with a number of wrapped filament layers are processed into a sheet of composite material. The post processing transforms the processed composite sheets into three-dimensional structures. By draping, compression molding, or other post processing technique, a composite sheet can be pressed, shaped, and cured into an outer shell of a helmet, or virtually any other rigid object, for example.

In a particular implementation, the winding of the filament 100 onto the substrate 221, the processing of the substrate 221 and filament windings into a composite material, and the post processing of the composite material into useful three-dimensional structures are all automated processes that occur in succession without human intervention. For other embodiments, one or more of the processes indicated above involve human assistance. A person, for example, might thread the filament 100 through the filament winding system 200 and/or remove the substrate 221 and the wrapped filament layers from the substrate mounting structure 224 and place them in a press for processing.

For some implementations, one or more wound filament layers are processed into a composite material within the same environment for which the winding of the filament layers around the substrate occurs. The application of heat and/or pressure to the filament layers wrapped around the substrate 221, for example, occurs while the substrate 221 remains mounted to the substrate mounting structure 224 within the filament winding system 200. Thereafter, the filament winding system 200 winds additional filament layers around the newly formed composite material with the substrate at its core. These additional filament layers, in turn, are consolidated with the previously processed layers by again applying heat and/or pressure.

Figure 15:
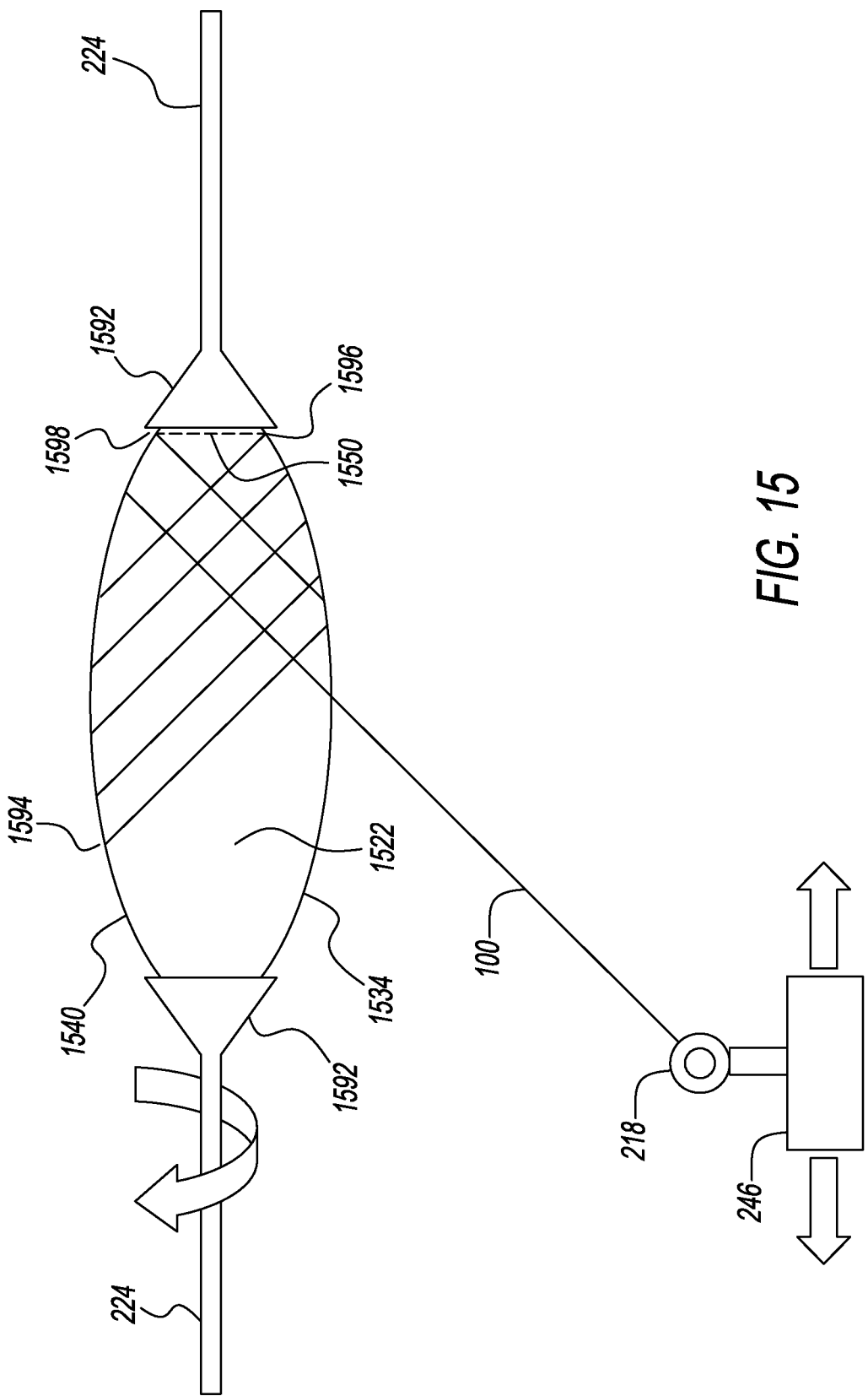
FIG. 15 shows a filament winding system winding a filament around a substrate having the form of a closed plane curve.

FIG. 15 shows the filament winding system 200 winding the filament 100 around a substrate 1522 shaped as symmetric closed plane curve, which in the present case represents an oval. The substrate 1522 has a continuous edge, with first 1534 and second 1540 edge parts being identified between mounting clamps 1592 of the substrate mounting structure 224. The mounting clamps 1592 secure the substrate 1522 to the substrate mounting structure 224 by fastening to, and obscuring from view, side portions of the oval-shaped substrate 1522 at the ends of a semi-major axis for the substrate 1522.

As shown, a first end of the filament 100 is attached to the second edge part 1540 at 1594. The transport carriage 246 and the filament guide 218 then guide the filament 100, as it winds around the rotating substrate 1522, to the point 1596, indicated on the first edge part 1534, to complete a first wrapped layer of the filament 100 around the substrate 1522. Tension in the filament 100 keeps the filament from sliding along the first 1534 or second 1540 edge parts during the winding process.

The filament winding system 200 then changes the winding orientation by completing a half wind 1550 of the filament 100 from the point 1596, on the first edge part 1534, to a point 1598, on the second edge part 1540. As the half wind 1550 is being completed, for example, the transport carriage 246 and the filament guide 218 remain stationary directly below, for the perspective shown, the rotating substrate 1522. For some embodiments, the filament 100 is guided around the substrate 1522 by winding or pulling the filament against one of the mounting clamps 1592. The mounting clamp 1592 used as a guide, for instance, keeps the filament 100 from sliding off the substrate 1522 when performing the half wind 1550. The half wind 1550 is represented by a broken line because the half wind 1550 passes around a back side of the substrate 1522 as pictured. In other embodiments, any number of half winds may be used to transition between winding orientations. The filament winding system 200 then winds a second wrapped layer of the filament 100 around the substrate 1522. Additional layers are wrapped, as needed, before processing the wrapped filament layers into a composite material.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as separately claimed subject matter.

We claim:

1. A method performed by a filament winding system, the method comprising:
    mounting a substantially flat substrate to a rotatable substrate mounting structure of the filament winding system, wherein the substrate has multiple edges and multiple corners with a different corner between each pair of adjacent edges of the multiple edges;
    rotating the substrate to wind a first filament of a set of filaments around the substrate in a first winding orientation that winds the first filament around a first pair of edges of the multiple edges to wrap a first filament layer around the substrate;
    changing winding orientations of the first filament relative to the substrate from the first winding orientation to a second winding orientation, without removing the substrate from the substrate mounting structure, by turning the first filament about a corner of the multiple corners; and
    winding the first filament around the rotating substrate in the second winding orientation that winds the first filament around a second pair of edges of the multiple edges, wherein the second pair of edges is different from the first pair of edges, to wrap a second filament layer around the substrate.

2. The method of claim 1 further comprising:
    winding a second filament of the set of filaments around the rotating substrate in the first winding orientation while the first filament is being wound around the rotating substrate in the first winding orientation;
    moving a first transport carriage of the filament winding system to guide the first filament onto the rotating substrate; and
    moving a second transport carriage of the filament winding system to guide the second filament onto the rotating substrate.

3. The method of claim 1 further comprising:
    winding a second filament of the set of filaments around the rotating substrate in the second winding orientation while the first filament is being wound around the rotating substrate in the first winding orientation;
    moving a first transport carriage of the filament winding system to guide the first filament onto the rotating substrate; and
    moving a second transport carriage of the filament winding system to guide the second filament onto the rotating substrate.

4. The method of claim 3 further comprising:
    moving the first transport carriage relative to the second transport carriage to weave the first filament with the second filament as the first filament and the second filament are wound around the rotating substrate.

5. The method of claim 1 further comprising:
    removing the substrate from the substrate mounting structure, with the first filament layer and the second filament layer wrapped around the substrate; and
    processing the first filament layer and the second filament layer into a composite material.

6. The method of claim 5, wherein processing the first filament layer and the second filament layer into the composite material comprises applying heat to the first filament layer and the second filament layer to raise a temperature of the first filament of the first filament layer and the second filament layer to a processing temperature below a melting temperature of a second component of the first filament, to leave the second component intact, and above a melting temperature of a first component of the first filament, to melt the first component into a continuous matrix in which the intact second component is embedded.

7. The method of claim 5, wherein processing the first filament layer and the second filament layer into a composite material comprises:
    applying heat to the first filament layer and the second filament layer to raise a temperature of the first filament of the first filament layer and the second filament layer to a processing temperature below a melting temperature of a second component of the first filament, to leave the second component intact, and near a melting temperature of a first component of the first filament, to soften the first component;
    applying pressure to the first filament layer and the second filament layer to fuse the softened first component into a continuous matrix in which the intact second component is embedded.

8. The method of claim 5 further comprising post processing the composite material by molding the composite material into a rigid three-dimensional shape.

9. A filament winding system comprising:
    a rotatable substrate mounting structure for mounting and rotating a substantially flat substrate to wind a first filament of a set of filaments around the substrate, wherein the substrate has multiple edges and multiple corners with a different corner between each pair of adjacent edges of the multiple edges;
    a first moveable transport carriage for guiding the first filament onto the substrate as the first filament is being wound around the substrate;
    at least one motor, coupled to the substrate mounting structure and coupled to the first transport carriage, for rotating the substrate mounting structure and for moving the first transport carriage;
    at least one controller, operationally coupled to the at least one motor, for controlling the at least one motor; and
    a processor, operationally coupled to the at least one controller, for executing a winding program to:
        rotate the substrate to wind the first filament around the substrate in a first winding orientation that winds the first filament around a first pair of edges of the multiple edges to wrap a first filament layer around the substrate;

change winding orientations of the first filament relative to the substrate from the first winding orientation to a second winding orientation, without removing the substrate from the substrate mounting structure, by turning the first filament about a corner of the multiple corners; and wind the first filament around the rotating substrate in the second winding orientation that winds the first filament around a second pair of edges of the multiple edges, wherein the second pair of edges is different from the first pair of edges, to wrap a second filament layer around the substrate.

10. The filament winding system of claim 9 further comprising a second moveable transport carriage, operationally coupled to the at least one motor, for guiding a second filament of the set of filaments onto the substrate as the second filament is being wound around the substrate, wherein the processor executes the winding program to further wind the second filament around the rotating substrate in the first winding orientation while the first filament is being wound around the rotating substrate in the first winding orientation.

11. The filament winding system of claim 10, wherein the first moveable transport carriage and the second moveable transport carriage are positioned on opposite sides of the substrate mounting structure so the mounted substrate rotates between the first moveable transport carriage and the second moveable transport carriage.

12. The filament winding system of claim 9 further comprising a second moveable transport carriage, operationally coupled to the at least one motor, for guiding a second filament of the set of filaments onto the substrate as the second filament is being wound around the substrate, wherein the processor executes the winding program to further wind the second filament around the rotating substrate in the second winding orientation while the first filament is being wound around the rotating substrate in the first winding orientation.

13. The filament winding system of claim 12, wherein the processor executes the winding program to further move the first transport carriage relative to the second transport carriage to weave the first filament with the second filament as the first filament and the second filament are wound around the rotating substrate.

14. The filament winding system of claim 9 further comprising a filament feeding apparatus to supply the first filament to the first moveable transport carriage for guiding the first filament onto the rotating substrate, wherein a single continuous length of the first filament is wound around the substrate to form the first filament layer and the second filament layer.

15. The filament winding system of claim 14, wherein the filament feeding apparatus supplies the first filament by dispensing the first filament from a spool of the first filament.

16. The filament winding system of claim 14, wherein the filament feeding apparatus supplies the first filament by extruding the first filament as the first filament is being formed.

17. The filament winding system of claim 16, wherein the first filament is formed from multiple components with at least two of the multiple components having different melting point temperatures.

18. The filament winding system of claim 17, wherein the multiple components of the first filament comprise a core component and one or more layered components surrounding the core component, wherein the core component has a higher melting point temperature than a sheath component, wherein the sheath component is an outermost component of the one or more layered components surrounding the core component.

19. The filament winding system of claim 17, wherein the multiple components of the first filament have optical properties which result in windings of the first filament being processed into a transparent composite material.

20. The filament winding system of claim 9 further comprising at least one tensioning device, through which the first filament passes, to sufficiently tension the first filament to prevent the first filament from slipping along the edges of the multiple edges of the substrate as the first filament is being wound around the substrate.

21. The filament winding system of claim 9, wherein the first moveable transport carriage guides the first filament onto the rotating substrate with a settable spacing between individual windings of the first filament around the substrate, wherein the settable spacing is set by the processor executing the winding program.

22. The filament winding system of claim 9, wherein the at least one motor comprises:
a first motor coupled to the substrate mounting structure for rotating the substrate mounting structure; and
a second motor coupled to the first transport carriage for moving the first transport carriage.

23. A filament winding system comprising:
a rotatable substrate mounting structure for mounting, rotating, and translating a substantially flat substrate to wind a first filament of a set of filaments around the substrate, wherein the substrate has multiple edges and multiple corners with a different corner between each pair of adjacent edges of the multiple edges;
a filament guide for guiding the first filament onto the substrate as the first filament is being wound around the substrate;
at least one motor, coupled to the substrate mounting structure for rotating and translating the substrate mounting structure, to which the substrate is mounted, relative to the filament guide;
at least one controller, operationally coupled to the at least one motor, for controlling the at least one motor; and
a processor, operationally coupled to the at least one controller, for executing a winding program to:
rotate the substrate to wind the first filament around the substrate in a first winding orientation that winds the first filament around a first pair of edges of the multiple edges to wrap a first filament layer around the substrate;
change winding orientations of the first filament relative to the substrate from the first winding orientation to a second winding orientation, without removing the substrate from the substrate mounting structure, by turning the first filament about a corner of the multiple corners; and
wind the first filament around the rotating substrate in the second winding orientation that winds the first filament around a second pair of edges of the multiple edges, wherein the second pair of edges is different from the first pair of edges, to wrap a second filament layer around the substrate.

24. A filament winding system comprising:
a rotatable substrate mounting structure for mounting and rotating a substantially flat substrate to wind a filament around the substrate;

a moveable transport carriage for guiding the filament onto the substrate as the filament is being wound around the substrate;

at least one motor, coupled to the substrate mounting structure and coupled to the transport carriage, for rotating the substrate mounting structure and for moving the transport carriage;

at least one controller, operationally coupled to the at least one motor, for controlling the at least one motor; and a processor, operationally coupled to the at least one controller, for executing a winding program to:

rotate the substrate to wind the filament around the substrate in a first winding orientation to wrap a first filament layer around the substrate;

change winding orientations of the filament relative to the substrate from the first winding orientation to a second winding orientation, without removing the substrate from the substrate mounting structure, by turning the filament about the substrate in a transitional direction that is different from a first direction of the first winding orientation and a second direction of the second winding orientation; and wind the filament around the rotating substrate in the second winding orientation to wrap a second filament layer around the substrate.

25. The filament winding system of claim 24, wherein the substrate is shaped as a closed plane curve or as a polygon.

26. The filament winding system of claim 24, wherein turning the filament about the substrate in a transitional direction comprises turning the filament against a portion of the rotatable substrate mounting structure in contact with the substrate.

* * * * *